US009020621B1

(12) United States Patent
Proctor et al.

(10) Patent No.: US 9,020,621 B1
(45) Date of Patent: Apr. 28, 2015

(54) NETWORK BASED MEDIA ENHANCEMENT FUNCTION BASED ON AN IDENTIFIER

(75) Inventors: James Proctor, Melbourne Beach, FL (US); Mark Skowronski, Melbourne, FL (US); James R. Bress, Melbourne Beach, FL (US); Lee S. Krause, Indialantic, FL (US); George Shenoda, Portland, OR (US)

(73) Assignee: Cochlear Limited, Macquarie University (AU)

(*) Notice: Subject to any disclaimer, the term of this patent is extended or adjusted under 35 U.S.C. 154(b) by 671 days.

(21) Appl. No.: 12/948,515

(22) Filed: Nov. 17, 2010

Related U.S. Application Data

(60) Provisional application No. 61/262,478, filed on Nov. 18, 2009, provisional application No. 61/324,833, filed on Apr. 16, 2010, provisional application No. 61/370,580, filed on Aug. 4, 2010.

(51) Int. Cl.
*G06F 17/00* (2006.01)
*H04R 5/04* (2006.01)
*H04R 25/00* (2006.01)

(52) U.S. Cl.
CPC . *H04R 5/04* (2013.01); *H04R 25/75* (2013.01)

(58) Field of Classification Search
CPC ...... H04S 7/301; A61B 5/12; H04R 2225/55; H04R 25/70; H04R 5/04; H04R 2205/041
USPC .................... 700/94; 704/500–504; 455/3.06; 381/26, 303
See application file for complete search history.

(56) References Cited

U.S. PATENT DOCUMENTS

| | | | | |
|---|---|---|---|---|
| 6,275,797 | B1 * | 8/2001 | Randic | 704/233 |
| 6,996,068 | B1 * | 2/2006 | Sherlock | 370/248 |
| 7,076,316 | B2 * | 7/2006 | Rabipour et al. | 700/94 |
| 7,630,501 | B2 * | 12/2009 | Blank et al. | 381/58 |
| 7,657,829 | B2 * | 2/2010 | Panabaker et al. | 715/203 |
| 2003/0031333 | A1 * | 2/2003 | Cohen et al. | 381/303 |
| 2005/0260985 | A1 * | 11/2005 | Rader et al. | 455/432.3 |
| 2007/0112563 | A1 * | 5/2007 | Krantz et al. | 704/216 |
| 2010/0142735 | A1 * | 6/2010 | Yoon et al. | 381/303 |

* cited by examiner

*Primary Examiner* — Andrew C Flanders
(74) *Attorney, Agent, or Firm* — Merchant & Gould P.C.

(57) ABSTRACT

A network based processing element for processing audio information improves the understanding of speech or music for intended listeners based on an identifier. The processing involves performing a media enhancement function, where a parameter affecting the utilization or performance aspects of the media enhancement function are dependent upon the identifier. A "media enhancement server" (MES) is included, whereby the audio of a telephone call, video call, multimedia program or other stream to be heard by a specific listener is processed using a personalized audio enhancement parameter to enhance the audio signal such that the listener will enjoy a benefit, such as better comprehension of the information, reduced listening effort, and more listening comfort during the call. The personalized parameters are stored and retrieved based upon the identifier, and used within the MES. The audio portion of the call or stream could be speech, music, or a combination.

20 Claims, 14 Drawing Sheets

NETWORK BASED MEDIA ENHANCEMENT FUNCTION BASED ON AN IDENTIFIER

CROSS-REFERENCE TO RELATED APPLICATIONS

This application claims priority under 35 U.S.C. §119(e) to U.S. Provisional Patent Application Ser. No. 61/262,478, filed Nov. 18, 2009, entitled "Communications, Telephony, and Entertainment Systems Utilizing Speech-based Optimization"; U.S. Provisional Patent Application Ser. No. 61/324,833, filed Apr. 16, 2010, entitled "Network Based Media Enhancement Function Based on an Identifier"; and U.S. Provisional Patent Application Ser. No. 61/370,580, filed Aug. 4, 2010, entitled "Network Based Media Enhancement Parameters Generation and Control Function"; the disclosures of which are hereby incorporated by reference herein in their entireties.

FIELD OF THE INVENTION

The invention relates generally to telecommunications, and more specifically, to the use of audio processing to improve the intelligibility of speech heard by a listener.

ACRONYMS

The following acronyms are used herein:
AGC: Automatic Gain Control
AIN: Advanced Intelligent Network
IMS: IP Multimedia Subsystem, as described in 3GPP TS 23.228, "IP Multimedia Subsystem (IMS); Stage 2", available at http://www.3gpp.org, the disclosure of which is hereby incorporated by reference herein in its entirety.
IN: Intelligent Network
MEP: Media Enhancement Parameters Database
MES: Media Enhancement Server
MEF: Media Enhancement Function
MRF: Media Resource Function
MRFC: Media Resource Function Control
MRFP: Media Resource Function Processor
PS: Provisioning Server
PSTN: Public Switched Telephone Network
SCP: Service Control Point (AIN)
SIP: Session Initiation Protocol, as described in Internet Engineering Task Force Request for Comments 3261 (IETF RFC 3261), "SIP: Session Initiation Protocol," available at http://www.ietf.org, the disclosure of which is hereby incorporated by reference herein in its entirety
SSP: Service Switching Point (AIN)
STP: Signal Transfer Point (AIN)

BACKGROUND

Currently, the voice and audio services provided within the telephony networks are designed for a listener with relatively normal hearing. However, the hearing device industry has shown that the customization of hearing devices provides for significant benefit in the understanding of speech and hearing in general. Audio processing techniques used to improve the hearing acuity of a listener are well known in the fields of hearing aids and other devices used for the hearing impaired. It is further well known in the hearing impaired community of the existence of "specialty telephones" designed with features to increase the amplitude of a signal and the clarity of the signal using methods including volume control (gain), tone control (equalization), and other audio processing techniques. These specialty telephones and other related devices are expensive, manually controlled by the user, and have limited features when compared with the mobile and fixed telephones available for normal hearing individuals. Due to the cost, these devices have limited capabilities, and are not manageable or upgradeable. Because of these limitations, the use of such devices is limited to individuals with significant hearing impairment.

In the field of telecommunications networks, network based devices which provide for the enhancement of the quality of audio signals are well known for the processing of signals generically. Such devices are used to perform acoustic echo cancellation, signal amplification, filtering and other such functions generally required to meet the audio quality requirement of certain industry standards and the expectations of the relatively normal hearing individual in relatively quiet environments.

Call routing capabilities for inbound and outbound calls provided by various voice telecommunications networks are well known in the telecommunications industry. The Public Switched Telephone Network (PSTN) features and services are built around the Intelligent Network (IN) and the Advanced Intelligent Network (AIN) service creation and implementation architectures. In the IN and AIN enabled network, the telephone switch connects to a Service Control Point (SCP) which provides information and logic regarding how to handle incoming and outgoing calls to the telephone switch. AIN services such as "Selective Call Acceptance" allow for forwarding all calls received by a specific customer to another telephone number except calls from a specific telephone number, or groups of numbers, are not forwarded and are routed to the customer's telephone or telephone line. There are many different outbound call routing features possible within the AIN architecture to control the routing of outbound calls including "selective call routing," "automatic call routing," "hotline," etc.

Newer network implementations based on the IP Multimedia Subsystem (IMS) architectures build on the service creation and control capabilities developed under the AIN and provide more flexibility and control of call routing and call control capabilities.

IMS networks include the ability to implement a specific service using an Application Server (AS) where the service control logic exists. An IMS-AS may include features which control call routing and other call features associated with a voice services subscriber. A well known element in the IMS architecture is the Media Resource Function (MRF) which is a network element designed to provide processing of the digitized media carried in a call, including audio based media. One provider of MRF capability is Radisys, with their Convedia media server product line. It is known in the art that such platforms provide for Voice Quality Enhancement (VQE) capability including compensation for acoustic echo, noise compensation, and packet loss based on specific quality metrics. The PSTN AIN architecture did not include a similar function as the IMS MRF but there are other well known methods for processing audio media in the PSTN including the use of an intermediate gateway, or call relay system.

Network based telecommunications elements as described herein and as known in the art may act as gateways, or provide other network functions, which may include audio processing functions. Currently, network based elements that provide audio processing provide the same audio processing methods to all calls that access the audio processing network element.

SUMMARY OF THE INVENTION

It is an object of this invention to provide for customized network based audio processing to enhance an audio signal to improve the hearing acuity, comfort or listening effort of a specific listener or group of listeners. The network may be a telecommunications network, a PSTN network, an internet protocol (IP) network, a IMS network, a PacketCable Network, a wireless network, or other network capable of delivering audio or multimedia streams containing audio to a specific intended device, listener or group of listeners which may be identified or associated with a unique identifier. Such identifiers may include, but are not limited to a telephone number, E.164 compliant number, a mobile identification number (MIN), international mobile subscriber identity (IMSI), or associated TMSI (Temporary Mobile Subscriber Identity), a MAC address, IP address, an SIP User Agent Uniform Resource Identifier (URI), a URL, user name or other input identifier, a password, stored unique "cookie" within a browser, and the like. Providing personalized audio enhancements would be beneficial for the general public but especially beneficial for listeners that have a hearing impairment and/or listeners that are using a telephone in a noisy environment such that their ability to hear the telephone audio is impaired during the call. It should be noted that the term "call" generally applies to a telephony network or VoIP network where voice or a voice and video call is transacted. However, it should be understood that while voice or video calls are discussed, the disclosed embodiments are generally applicable to other forms of media presenting audio such as a unidirectional video broadcast, a pod cast, internet radio, IP television, and other such media where an identifier may be used associated with a specific location, device, listener, or group of listeners.

A significant problem overcome by embodiments of the current invention is the fact that an individual's hearing impairment will be different from one person to another. Likewise, the local noise (e.g., room noise) environment during a call will be different on a per call basis. The parameters of the processing of the audio applied during a call needs to be "personalized" for the specific listener to match the person's actual needs based on the parameters of the person's specific hearing loss and/or the parameters of the noise environment at the listener's location. In situations where a speaker phone is being used for a group of individuals, the personalization of the parameters may be modified to enable some enhancement feature and disable others. In such a situation the local noise would be common to a group of listeners if a speaker phone is being used during a call, or if a video stream is being viewed by more than one individual.

It is an additional object of this invention is to provide for a network based processing element for processing audio information, to improve the understanding of speech or music for one or more intended listeners based on an identifier, where the processing involves performing one or more media enhancement functions, where one or more parameters affecting the utilization or performance aspects of the one or more media enhancement functions are dependent upon the identifier.

In an embodiment of the current invention, a "media enhancement server" (MES) is included, whereby the audio of a telephone call, video call, multimedia program or other stream to be heard by a specific listener is processed using personalized audio enhancement parameters to enhance the audio signal such that the listener will enjoy any number of benefits including better comprehension of the information, reduced listening effort, and more listening comfort during the call. The audio of the call could be speech, music, or a combination of speech and music. Further the audio may be presented as part of an audio visual media stream such as a video call, music video, a newscast, movie, or television program. There is a need for personalized, network-based, audio enhancement for telephone calls or other media streams containing audio. In an embodiment of the invention, the personalization of a call or other media stream's audio by either enabling or disabling the MES, specific techniques functions or routing call related audio through the MES, based on a identifier which identifies the specific listener, the device, or the access line for the call. The parameters of the audio enhancement are also selected or retrieved from a storage source based on the identifier.

Specific derivation approaches and additional details of the specific parameters used for audio enhancement for any specific listener are obtained through specialized hearing tests which are disclosed in U.S. Pat. No. 7,206,416, entitled "Speech based optimization of digital hearing devices," the disclosure of which is hereby incorporated by reference herein in its entirety. Any provided examples of parameters and enhancement techniques herein should not be construed as a limitation to the current embodiments, but simply as one or more illustrative approaches. For the purpose of example of a parameter for automatic gain control, the user may be provided a choice of the most comfortable listening level among a number of different audio samples presented at differing loudness levels. The user would provide feedback as to the desired level. The setting would be stored within a network element to be applied within the MES, as a specific media enhancement function (MEF). Other MEFs which may be personalized may include equalization, desired audio output levels, noise cancellation or adaptation techniques, automatic gain control, filtering, and the like.

In another aspect, the invention relates to a system for improving perceived audio quality in a communications network having a provisioning server for routing audio from and to a user, the system including: a signal processor; a communication device connected to said communication network by a user; an identifier received by said signal processor; a transmitter for transmitting audio signals to said communication device; a receiver for receiving responses to said audio signal from said communication device; a comparator in said signal processor for determining the error between the audio signal transmitted from said signal processor to said communication device and the response audio signal; and a logic control generator for identifying at least one parameter to be applied to subsequent audio signals subsequently transferred to said communication device. In an embodiment, the identifier includes at least one of a Mobile Identity number (MIN), an IMSI, a TMSI, a phone number, a SIP URL, a MAC address, a user name, a user selection, an account number, an IP address, a device address, a device serial number, a caller identification, an identity indication, a virtual connection (VC), a connection identifier, a CID, a CNID, and a line identification. In another embodiment, the logic control generator is adapted to select a parameter for altering a voice signal, said parameter including at least one of an automatic gain control, an audio gain control, an equalization, and an energy redistribution. In yet another embodiment, said transmitter, said receiver, said comparator, and said logic control generator are physically located in the provisioning server. In still another embodiment, said parameter is transferred from said provisioning server to a media enhancement server and is applied to a subsequent audio signal by said media enhancement server.

In another embodiment of the above aspect, said media enhancement server is located discrete from said provisioning server. In an embodiment, said logic control generator is adapted to generate at least one parameter in a first optimization step, and wherein the system further includes a media enhancement server adapted to apply said parameter to voice signals in a temporally different step. In another embodiment, wherein the provisioning server is adapted to receive a first telephone call and the media enhancement server is adapted to receive at least one subsequent telephone call and forward automatically the at least one subsequent telephone call to a third party. In yet another embodiment, the provisioning server is adapted to receive a first telephone call from the user and the media enhancement server is adapted to receive at least one subsequent telephone call from a third party and forward automatically the at least one subsequent telephone call to the user. In still another embodiment, the provisioning server is adapted to initiate a first telephone call to the user and the media enhancement server is adapted to receive at least one subsequent telephone call from the user and forward automatically the at least one subsequent telephone call to a third party. In another embodiment, said media enhancement server is adapted to store the at least one parameter. In another embodiment, said receiver is adapted to receive keyed information from an operator, wherein the operated records responses to said audio signals.

In another aspect, the invention relates to a method for improving the quality of media content, the method including: identifying a media device connected to said media communication network; transmitting a media signal to a user of said media device; receiving a response signal from said user; comparing said transmitted media signal and said response signal to determine an error between said transmitted media signal and said response signal; determining at least one parameter; and modifying a subsequent media signal provided to said media device using said parameter. In an embodiment, said transmitted media signal and said response signal each are audio signals. In another embodiment, the method includes selectively applying said parameter to a second subsequent media signal. In yet another embodiment, the method includes applying the parameter to a second media device based on a selection by the user. In still another embodiment, the method includes applying, by a media enhancement server, said parameters to a second subsequent media signal in said communication network. In another embodiment, the method includes applying, by said media device, said parameters to a second subsequent media signal in said communication network.

In another aspect, the invention relates to An article of manufacture having computer-readable program portions embedded thereon for improving the quality of media content, the program portions including: instructions for identifying a media device connected to said media communication network; instructions for transmitting a media signal to a user of said media device; instructions for receiving a response signal from said user; instructions for comparing said transmitted media signal and said response signal to determine an error between said transmitted media signal and said response signal; instructions for determining at least one parameter; and instructions for modifying a subsequent media signal provided to said media device using said parameter.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE DRAWINGS

Figure 1:
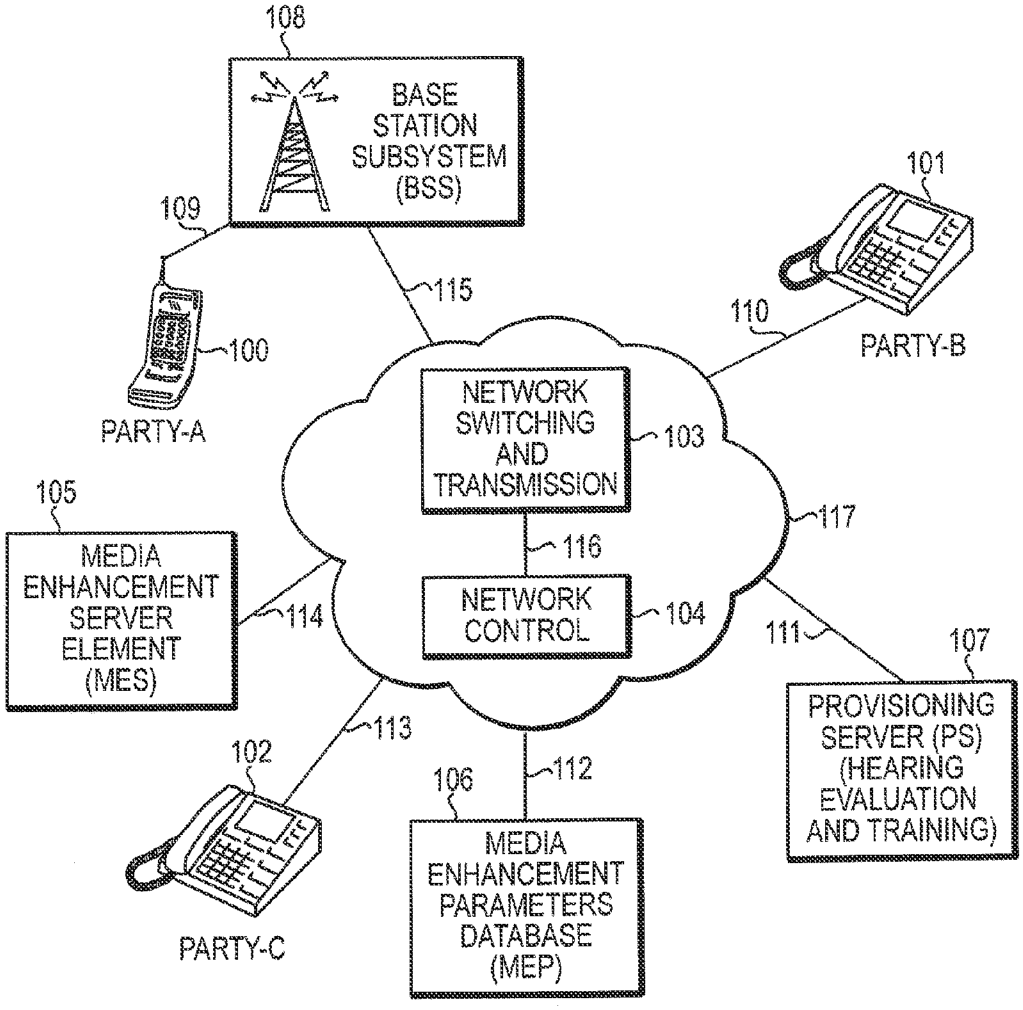
FIG. 1 illustrates a generalized network architecture with a Media Enhancement Function.

FIG. 1 depicts a generalized architecture for a telecommunications network. The primary purpose of a telecommunications network is to connect end users, which are connected to the network, to each other. The media carried through the connections may be audio, video, or data and any combinations of these media for any given end-to-end connection. The end users may be a person using a media device such as a telephone, a videophone, or any other device capable of transmitting and/or receiving media. The end users are often referred to as "end-points," "user-agents," and any other term signifying the element connected to the network which originates and terminates connections which send and/or receive media which is carried through, or across the network. The network (117) in FIG. 1 is depicted as a "cloud" which is well known to those skilled in the art of telecommunications to identify a connection of elements which are capable of interworking to provide the necessary functions and features to make connections between end-points and to implement network based features provided to the end-points. The actual devices and equipment which are interconnected in the network cloud may have many different functions and may communicate with each other using a variety of communications protocols. The network functions, communications, and protocols can be divided into two separate categories: 1) switching and transmission, and 2) control. The elements depicted inside the network cloud (117) are Network Control (104) and Network Switching and Transmission (103). Network Switching and Transmission (103) represents either a single entity, or multiple entities connected together, to provide switching and transmission of media within the network. Network Control (104) represents either a single entity, or multiple entities connected together, to provide control logic and signaling to other network entities to manage connection functions such as call set-up, call take-down, and call features. Communications link (116) represents the control and status information which flows between the Network Control (104) and the Network Switching and Transmission (103) to implement network connections and network features. One of ordinary skill in the art will recognize that a variety of control, logic, features and signaling techniques may be utilized in telecommunication networks.

Figure 2:
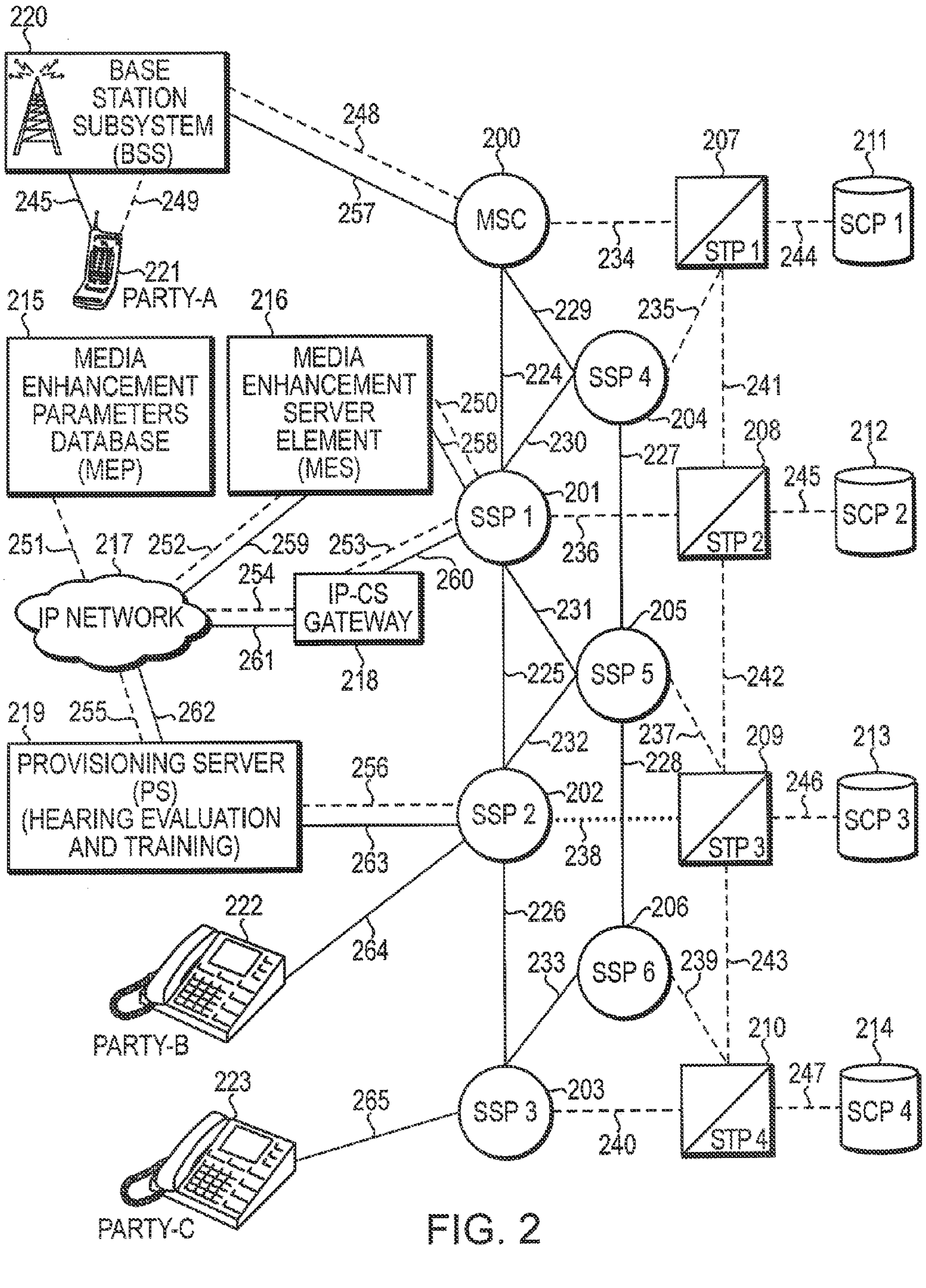
FIG. 2 illustrates a PSTN-AIN based network architecture with a Media Enhancement Function.
Figure 3:
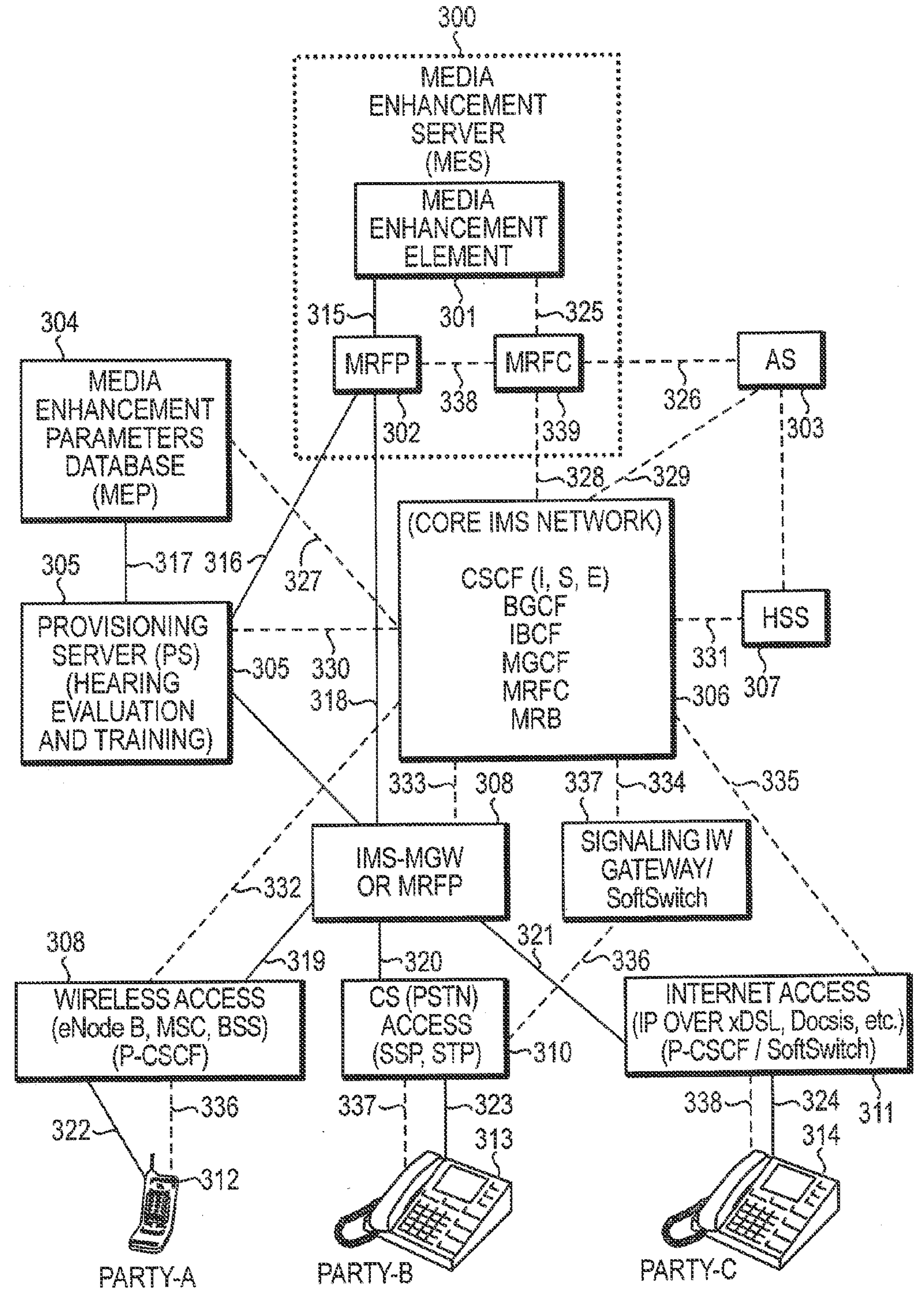
FIG. 3 illustrates an IP Multimedia Subsystem (IMS) based network architecture with a Media Enhancement Function.

FIG. 1, FIG. 2, and FIG. 3 show different network architectures. In each of the network architectures dashed lines represent logical connections for control information and solid lines represent logical connections for media. Control and media information may both be carried over the same physical connection but it is well known to those skilled in the art of telecommunications that networks make use of separate logical connections for control data and media data.

Signaling control protocols and communications are used to control the network operations and features. Transmission protocols and communications are used to transport media (such as audio or video) from one end-point to another end-point, or between network elements. The media may flow through multiple devices in the network during transmission from one end-point to another end-point, for example in FIG. 1 when Party-A (100) calls Party-B (101).

The different communication links shown in FIG. 1 (109, 110, 111, 112, 113, 114, 115, 116) may carry "media" (e.g., audio, video), or control information (e.g., call set-up and call control data). Connections may also carry both media and control information.

The invention includes a MES (105) network element which is depicted in FIG. 1. The MES (105) element is responsible for performing processing of audio streams which will be routed through the MES (105) to enhance the audio signal for the purposes of improving the hearing acuity, or intelligibility, for the person that will eventually hear the enhanced audio signal carried in the audio stream of the network connection.

The MEP (106) depicted in FIG. 1 contains parameters for implementing an audio enhancement processing function, or a set of functions, that are personalized. The parameters are personalized due to the fact that the parameters are developed during a process of hearing acuity evaluation. During hearing acuity evaluation of a person, parameters are developed to be used for programming, or controlling, an audio processor in the MES (105) which enhances the audio signal heard by the same person for whom the hearing acuity evaluation was performed. The audio enhancement is therefore "personalized" for the specific person for which the audio parameters are used during a call. Testing hearing acuity and the development of audio processing parameters to be used by a device to improve a person's hearing acuity are well known to those skilled in the art of hearing aids and related personal use devices used to improve the hearing acuity of a person.

It would generally be expected that the audio enhancement of Party-A's (100) received audio signal would occur for both outgoing and incoming calls. It is possible that only outgoing or only incoming calls could have the audio processing applied to the audio signals sent to Party-A (100), but certain embodiments of the invention contemplate a system for which the personalized audio enhancement feature works for both outgoing and incoming calls.

If Party-A (100) has a media enhancement service enabled, or configured, or has subscribed to a media enhancement service, then the Network Control (104) routes incoming and outgoing calls for Party-A (100) through the MES (105). Alternatively, a network may be configured such that all calls are routed through a network element which provides media enhancement functions and then the personalized audio processing is activated, or enabled, based on the identification of an identifier associated with the audio stream (call) and without call routing being required.

Network Elements Implementation and Inter-Connection

FIG. 1 shows separate network elements for the MES (105), the PS (107), and the MEP (106). Depending on specific network implementations, these network elements may be physically located in the same entity or in separate entities either directly connected, or connected by a network. Any combination of implementation is possible including:

1. MES (105), MEP (106), and PS (107) all separate entities
2. MES (105) and MEP (106) together and a separate PS (107)
3. MEP (106) and PS (107) together and a separate MES (105)
4. PS (107) and MES (105) together and a separate MEP (106)
5. MES (105), MEP (106), and PS (107) all together in one entity

Personalized Audio Processing Parameters Generation

A brief description of one embodiment for the generation of audio processing parameters for hearing optimization is described here for clarity.

A hearing evaluation service provided on a Provisioning Server (PS) (107) is accessed. Access to the actual hearing evaluation service can be over a telephone call, in-person with an audiologist, over the Internet, or other possible methods, but in each case the PS (107) will be used to configure the network such that the media enhancement service is enabled, or configured, for the entity associated with the hearing test. During interaction with the hearing evaluation service and the PS (107) the following actions occur. The order of these actions do not necessarily need to be in the order listed.

1. An identifier to identify for what person, access line, or device will the personalized audio parameters be associated with is obtained. This identifier can be associated with a person (e.g., voice recognition, user number/name, Personal Identification Number (PIN)), associated with one or more telephone devices (e.g., a MAC (Media Access Control) address or an IMSI (International Mobile Subscriber Identifier)), or associated with one or more telecommunications access lines or subscriptions (e.g., telephone number (Caller-ID), IP address, URI (Universal Resources Identifier) for which the audio processing feature will be activated. Those of ordinary skill in the art will recognize that other identifiers, or combinations of data used to form identifiers, may be used in the present invention.
2. A person accessing the hearing evaluation service may be instructed to listen to specific sounds and provide responses.
3. Alternatively, or in addition to the sounds based hearing test, the person may answer specific questions (e.g., age, occupation, gender, questions about hearing abilities, information about previous hearing tests). Alternatively, or in addition, additional information about the user could be acquired from other sources, such as through a carrier subscription agreement or medical records if uploaded by the user or a third party.
4. Personalized audio parameters, based on the hearing test results, and/or the specific personal information provided, are generated and passed to the PS (107).
5. The personalized audio parameters are stored for example in a database such as the MEP (106) under control of the PS (107).
6. The personalized audio parameters may be transmitted to an audio processor such as the MES (105) by the PS (107) as part of the hearing evaluation service process or the MES (105) may receive the personalized audio parameters from the PS (107) or the MEP (106) at another time.

Parameters generated for audio processing are personalized for a specific person by, for example:

1. Enabling or disabling a parameter, or media enhancement function entirely.
2. Selecting a setting for a parameter (for example, setting a gain control output target level, or attack or release rate).
3. More complex parameters such as those associated with frequency band equalization, Automatic Gain Control (AGC), noise cancellation, energy redistribution, and the like may include DSP (Digital Signal Processing) algorithms or other techniques wherein the personalized audio processing parameters include multiple settings for software code that is used to implement one, or multiple, audio processing functions.
4. Any other method where an audio processing parameter is determined based on information or feedback from the person intended to be hearing the audio signal.

One, or multiple, audio processing functions may be configured for a specific person wherein the audio signal the person hears is first processed through an MEF which implements the audio processing functions.

In a non-limiting example, techniques to determine some forms of audio processing parameters are disclosed in U.S. Pat. No. 7,206,416, entitled "Speech based optimization of digital hearing devices," and in co-pending U.S. Provisional Application No. 61/164,452, filed May 18, 2009, entitled "System and Methods for Determining the Nature of Hearing Weakness," the disclosures of which are hereby incorporated by reference herein in their entireties.

In one embodiment of the invention a person may access a PS (107) as described above. The PS (107) may present one, or multiple, hearing related tests to evaluate a person's assessment of speech quality and/or an evaluation of the person's ability to understand speech. During the hearing test process, the PS (107) may present test signals that represent options for parameters for each of the available audio processing functions. The PS (107) determines through the testing methods which parameters for each available audio processing function provide the preferred performance for the individual being tested. These parameters are then stored to be used in a MEF during live call audio processing.

In one embodiment of the invention, the hearing related tests are performed by obtaining information or hearing test feedback from the person for which the audio processing parameters are generated so the parameters will be personalized for that person's specific hearing needs. Additionally, the hearing test may be performed using the telephone device (e.g., a handset) that the person will use during actual telephone calls or network connections. The audio processing parameters are therefore personalized for the person's hearing capabilities and any audio effects caused by the telephone device such as frequency response, loudness control, or any other aspect of the telephone device's audio-acoustics signaling response.

In one example, if an equalizer function is to be generated, the parameters of the equalizer are adjusted to optimize the understanding of speech during a hearing test. Testing to determine equalizer parameters may be performed using well known tone threshold tests, or using more other techniques which use speech, or speech like, signals to determine when speech is understood, or misunderstood, to identify which frequencies need more emphasis. When the person's understanding of speech is optimized, or improved, the personalized equalizer settings are saved to be accessed later by the MES (105).

An example of the parameters for an equalizer MEF are shown in the table below. In this example, the gain applied to each frequency band relative to the 1 KHz frequency band is defined which are the settings found to be the preferred settings during a person's hearing test. These parameters are therefore personalized for the person who performed the hearing test and for whom the parameters were generated.

TABLE 1

Exemplary parameters for equalizer MEF

| Freq. (Hz) | 200 | 250 | 315 | 400 | 500 | 630 | 800 | 1000 | 1250 | 1600 | 2000 | 2500 | 3150 | 4000 | 5000 | 6300 | 8000 |
|---|---|---|---|---|---|---|---|---|---|---|---|---|---|---|---|---|---|
| Level Relative to 1 KHz (dB) | −3.2 | −2.8 | −2.0 | −1.5 | −1.0 | −0.5 | −0.2 | 0.0 | 1.5 | 1.8 | 2.4 | 2.9 | 5.3 | 5.1 | 4.7 | 3.2 | 1.2 |

In another example, during a hearing test, the user may be asked to select the most preferred signal amplitude, selecting from multiple passages of speech presented to the person at different amplitude levels. In this way, the PS (107) hearing test determines the preferred signal amplitude for the person and this information can be used to configure a personalized AGC function used by the MES (105) so the amplitude of signals heard by the person are adjusted dynamically during a call or network connection to the amplitude preferred by the person tested. For the AGC example, if a person was tested to find the preferred signal level for the acceptable received audio signal and this level was found to be 16 dB below the digital full scale (digital maximum) then the parameter to an AGC could be "−16 dB" indicating 16 dB below digital full scale is the target digital audio level.

Other examples of personalized audio processing parameters which may be generated based on a hearing test or other personalized evaluation method include but are not limited to energy redistribution, noise cancellation, gain settings based on noise in the environment of the person using the media enhancement function, or any other audio processing function that can be enabled or disabled, adjusted with a setting, or configured with multiple settings or programming.

Provisioning the Media Enhancement Service

After personalized audio processing parameters are generated, the entity for which the parameters were generated may elect to configure the telecommunications network to activate a media enhancement service which routes calls through, or enables the MES (105). The PS (107) may be used to configure the telecommunications network. The term "provisioning" is well known to those skilled in the art of telecommunications to describe the actions of configuring network elements to provide specific services and features. One of the ordinary skill in the art will recognize that the MES 105 may be in the same server with the PS 107, or may be located in another place discrete therefrom.

The PS (107) may be implemented to provide access by multiple methods including, but not limited to, a live operator, in-band signaling control (e.g., DTMF) similar to an IVR (Interactive Voice Response) system, web browser access over the Internet. When the user accesses the PS (107) an identifier is obtained which is associated with personalized audio processing parameters generated during a hearing evaluation test, and possibly stored in the MEP (106), or elsewhere. The PS (107) provides the means to enter parameters which control how the media enhancement service will be implemented by the telecommunications network. The parameters may include, but are not limited to:

1. Enable or disable the MES (105), or individual media enhancement functions performed thereby.
2. Specific device identifiers that the telecommunications network can identify to enable or disable the MES (105).
3. Specific access line, logical connection, or service subscription identifiers (e.g., telephone number, IP address, URI, and the like) that the telecommunications network can identify to enable or disable the MES (105).
4. Service providers for which to enable or disable the MES (105).
5. Identification of audio processing parameters to be used by the MES (105) with specific MEFs.

After the provisioning parameters have been selected, the PS (107) communicates with the required network elements (MES (105), Network Control (104)) to configure the network to provide the services selected by the user.

In other embodiments of the invention, network provisioning is handled by other methods for configuring the telecommunications network to use the personalized audio processing parameters in a MES (105). One of ordinary skill in the art will recognize that the telecommunication network may implement the audio processing parameters in a variety of locales within the call flow of the network, and that the parameters associated with the user may be stored in different easily accessible locales for use in such audio processing.

Figure 10:
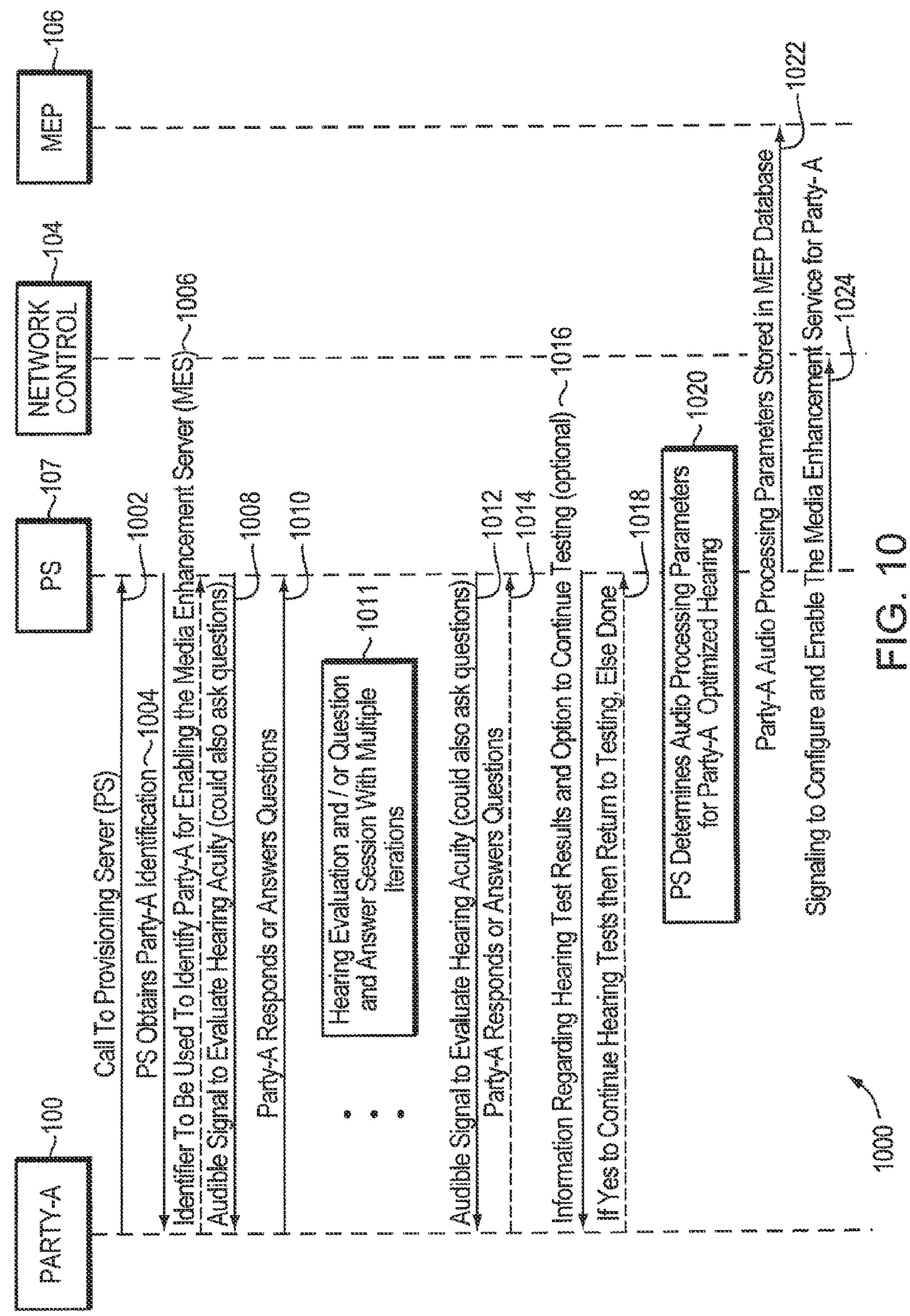
FIG. 10 illustrates a call flow sequence example for connection to a Provisioning Serve for the generalized network architecture of FIG. 1.

FIG. 10 depicts one embodiment of the invention showing call flows for the hearing tests and personalized parameters generation and the provisioning of the network using the PS (107). One of ordinary skill in the art will recognize that a variety of call flows may be used within the context of the present invention.

Party-A (100) calls the provisioning server (PS)(107)(Step 1002) which requests an identifier of Party-A (100)(Step 1004). Party-A (100) sends an identifier to the PS (107) for enabling the MES (Step 1006). The PS (107) sends at least one audible signal or at least survey question to Party-A (100) to evaluate hearing acuity (Step 1008) to which Party-A (100) responds to the PS (107)(Step 1010). The hearing evaluation and/or question-and-answer session between the PS (107) and Party-A (100) may have multiple iterations (Step 1011). The hearing evaluation and/or question-and-answer session concludes with a final audible signal or survey question sent from the PS (107) to Party-A (100)(Step 1012) to which Party-A (100) responds (Step 1014). Results from the hearing evaluation and/or the question-and-answer session and the option to continue may be optionally sent from the PS (107) to Party-A (100)(Step 1016) to which Party-A (100) may respond (Step 1018). After the hearing evaluation and/or the question-and-answer session is completed (either in Step 1014 or Step 1018), the PS (107) determines audio processing parameters for Party-A (100) optimized hearing (Step 1020). The PS (107) transmits the audio processing parameters for Party-A (100) to the MEP (106) to be stored in the MEP database (Step 1022). The PS (107) signals network control (104) to configure and enable the MES for Party-A (100)(Step 1024).

Audio Processing Parameters Interface

In one embodiment of the invention, MEFs are defined and specified such that the parameters associated with each MEF can be received by an audio processor (MEF) and the desired audio processing effect is implemented. The concepts and methods for passing parameters to implement a function and the use of Application Programming Interfaces (APIs) is well known to those skilled in the art of computer programming.

In an embodiment of the invention using a defined parameter interface, the parameters generated for each MEF include the information required to implement the intended audio processing.

In the previously described example for generating parameters for an AGC MEF, the AGC function could be implemented using the "−16 dB" parameter and the exact details of the AGC implementation left to the actual device on which it is implemented. The use of audio parameters allows for the actual implementation of the MEFs to be abstracted by defining the parameters of the MEFs and not the exact implementation. Abstracting implementation through the use of parameters is well known to those skilled in the art of computer programming. In the previously described example for generating parameters for an equalizer MEF, the equalizer function could be implemented using the parameters such as those described in the table given in the example. These parameters may be passed to, or retrieved by, an audio processor implementing an MEF and then the MEF can implement the equalizer function using the received parameters.

The MEF can receive parameters for one or multiple audio processing functions which will be used to implement one or multiple audio processing functions which are applied to the audio to be heard for whom the personalized audio processing parameters were generated. Devices or elements within which MEFs may be implemented include but are not limited to: a telephone endpoint (handset, headset, speakerphone, etc.), gateway, switch, Media Resource Function Processor (MRFP), or any other device or element which can process the media stream of a call or network connection.

Controlling the Parameters in a MES or MEF

A Media Enhancement Server (MES) or a Media Enhancement Function (MEF) provides the capabilities to implement audio processing for which the specifications of the audio processing are determined by personalized parameters determined for the intended listener. The audio processing is performed on the media stream of a call or network connection for which the intended listener will hear the processed audio signal that was processed using parameters determined for that intended listener. In one embodiment of the invention, a media enhancement service which offers the audio processing features may provide a means to control the settings, or options, for one or multiple parameters which are used for controlling the audio processing. For example, a means to enable or disable, one, multiple, or all audio processing functions may be provided. In another example a means to control a parameter setting such as an AGC gain target, or a noise detection threshold level may be provided. The methods which may be provided to a user to control MEF audio processing parameter settings include, but are not limited to DTMF signaling during a call or network connection, speech commands during a call or network connection, any in-band or out-of-band signaling between the user and the MES/MEF, interfaces to an Interactive Voice Response (IVR) system, web interfaces, or any other method by which a user can change or control the parameters associated with an MEF.

Two-Way Call Connections

In the following call connection descriptions, both the sending and receiving audio path for the person using the media enhancement service are routed through the MES (105). In another embodiment of the invention, only the received audio for the entity using the media enhancement service is routed through the MES (105) and the sending audio is routed through a different network path.

Call Control and Call Routing Methods

The specific call control methods specified in the following call descriptions describe only one embodiment of the invention. It is well known to those skilled in the art of telecommunications that there exists many methods used by different telecommunications networks to control call routing, call set up, and call completion. The invention may make use of well known telecommunications networks features including call routing and call forwarding to route network connections related audio to the MES (105) during call set-up, or all calls may be routed through the MES (105) without call routing required.

Media Enhancement Service Provisioning

In the following call connection descriptions the personalized media enhancement service has been activated by Party-A (100) by the methods provided for service activation by the service provider. Service activation in this case means that when the entity associated with Party-A (100), (person, telephone device, access line), is identified by the network, the network has been configured and provisioned to route calls as required through the MES (105), or enable the MES (105), to implement the personalized media enhancement service for Party-A's (100) calls.

Following is a description of an example in one type of network of the signaling and connections that are made to implement the media enhancement service for the audio stream of network connections for both outgoing and incoming calls in the generalized network depicted in FIG. 1.

Outgoing Calls Routed to the MES (105)

Figure 4:
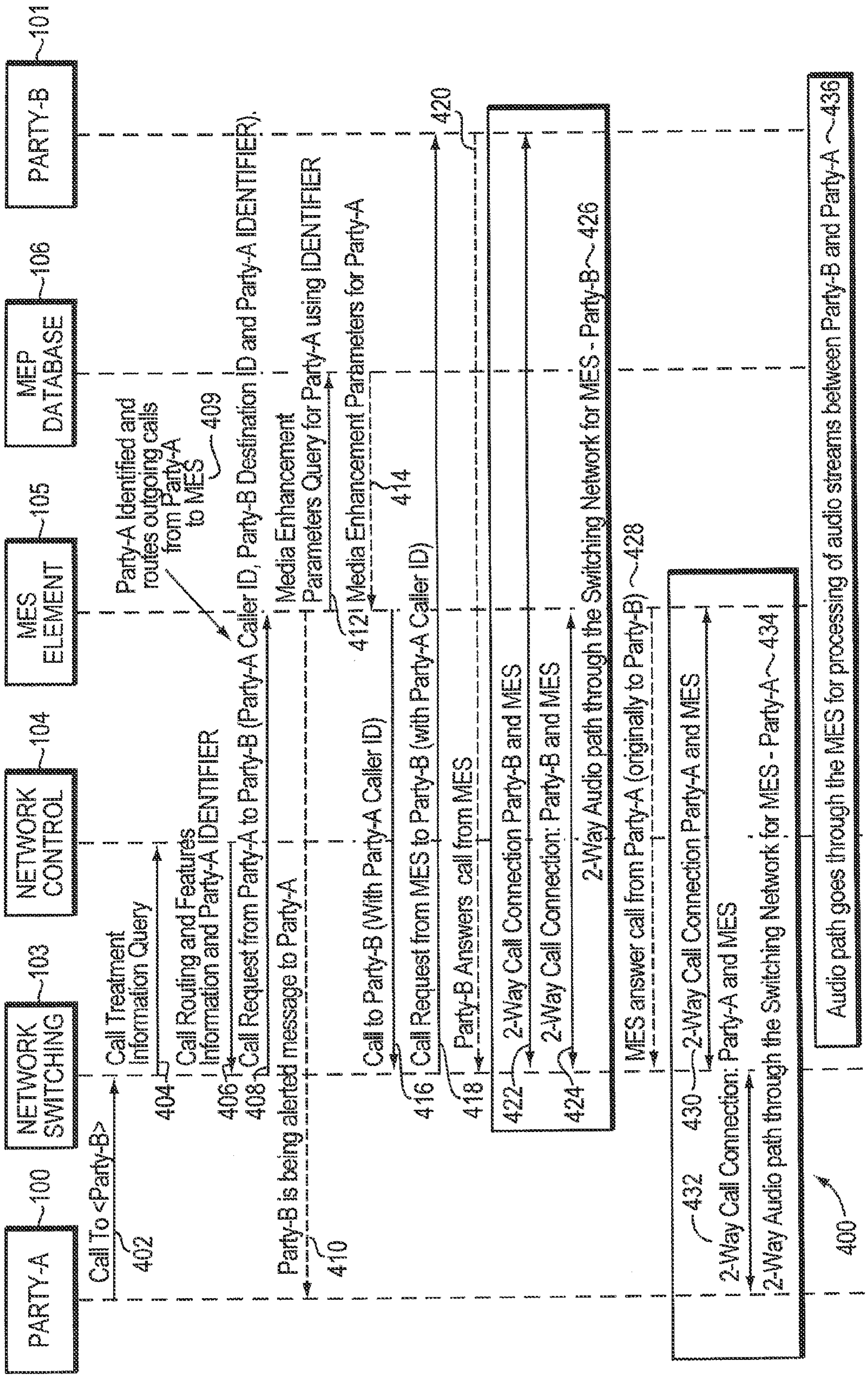
FIG. 4 illustrates a call flow sequence example for outgoing calls connected through the Media Enhancement Function for the generalized network architecture of FIG. 1.

FIG. 4 depicts an exemplary call sequence for the generalized network of FIG. 1 describing one embodiment of the invention to implement the personalized media enhancement service for outgoing calls. When Party-A (100) initiates a network connection request (a call) to Party-B (101) (Step 402) by signaling Party-B's (101) network address (for example the telephone number) to the Network Control (104) (Step 404) over communication links (109) and (115), the Network Control (104) determines the routing for the call from Party-A (100) to Party-B (101) and also procedures to implement features enabled for Party-A (100) (Step 406). Party-A (100) may be identified by the network by means including the telephone number or network address associated with the communication link (109), a Personal Identification Number (PIN) entered by Party-A (100), a code signaled by Party-A (100) (e.g., user number or password), a serialized code (e.g., a MAC (Media Access Control) address or an IMSI (International Mobile Subscriber Identifier) used in cellular devices) associated with the device of Party-A (100) transmitted during call set up, voice recognition of the person associated with Party-A (100), or any other method which provides an identifier used to identify the person, device, or access line associated with Party-A (100) that is used by the Network Control (104) to identify that the call has the media enhancement service activated and thus Party-A's (100) outgoing call is routed to the MES (105) (Step 408).

Because the call associated with Party-A (100) has the media enhancement service configured and enabled, the Network Control (104) implements a connection request (a call request) to the MES (105) with the parameters in the connection request including the identifier used to identify Party-A (100) for the media enhancement service (Step 409). The connection request will also include Party-B's (101) network address (e.g., Party-B (101) telephone number) and an indication that the connection request is to be connected through the MES (105) and then to Party-B (101) (Step 410). The signaling and methods for call routing features are well known to those skilled in the art of telecommunications networks.

When the MES (105) receives the call request from the Network Control (104) for the call from Party-A (100), the MES (105) then sends a query message to the MEP database (106), including the identifier associated with Party-A (100), to request the personalized audio processing parameters for Party-A (100) (Step 412). These parameters are looked up by the MEP (106) using well known database methods and then transmitted from the MEP (106) to the MES (105) (Step 414). The MES (105) then configures an audio processing function, or set of functions, based on the personalized parameters obtained for Party-A's (100) specific hearing needs. This personalized audio processing function will be applied to the audio media sent to Party-A (100) during the network connection.

Next, the MES (105) sends a call request message to Party-B (101) through the Network Control (104) (Step 416). Although, not necessary for the media enhancement service operation, in one embodiment of the invention, the call request from the MES (105) to Party-B (101) will include the Caller-ID (telephone number, network address, or other identifier) of Party-A (100) (Step 418). The techniques to implement the call request and set the Caller-ID of the calling party to be Party-A (100), rather than the telephone number associated with the MES (105), are well known to those skilled in the art of telecommunications.

Before, at the same time, or after the MES (105) sends the call request to Party-B (101) through the Network Control (104), the MES (105) sends a "call alerting" message to Party-A (100), through the Network Control (104), to inform Party-A (100) that Party-B (101) is being alerted to the call from Party-A (100). In most telecommunications networks, Party-A (100) will receive the "call alerting" message and generate a signal (e.g., audible ringing) to be received by the person at Party-A (100) to indicate Party-B (101) is being alerted to the call request from Party-A (100).

After Party-B (101) accepts the call, Party-B (101) sends a "call accepted" message to the MES (105) through the Network Control (104) (Step 420). Before, at the same time, or after the "call accepted" message is sent by Party-B (101) to the MES (105) (Step 422) through the Network Control (104), the Network Control (104) sends a message to the Network Signaling and Transmission (103) to establish an audio path (e.g., a voice trunk) between the MES (105) and Party-B (101) (Step 424) through the Network Switching and Transmission (103) (concluded at Step 426).

After the MES (105) receives the "call accept" message from Party-B (101), the MES (105) sends a "call accept" message to Party-A (100) through the Network Control (104)

in response to the original call request received from Party-A (100) (Step 428). Before, at the same time, or after the "call accept" message is sent from the MES (105) to Party-A (100) through the Network Control (104) (Step 430), the Network Control (104) sends a message to the Network Signaling and Transmission (103) to establish an audio path (e.g., a voice trunk) between the MES (105) and Party-A (100) (Step 432) through the Network Switching and Transmission (103) (concluded at Step 434). The two-way audio path between Party-A (100) and Party-B (101) is routed through the MES (105) (Step 436). In this embodiment, the MES (105) uses personalized audio processing functions to enhance the audio transmitted to Party-A. One of ordinary skill in the art will recognize that the order of the call sequence may vary in accordance with the present invention, and wherein the system is capable of providing audio signals in accordance with personalized audio parameters to one or more audio recipients.

Incoming Calls Routed to the MES (105)

Figure 5:
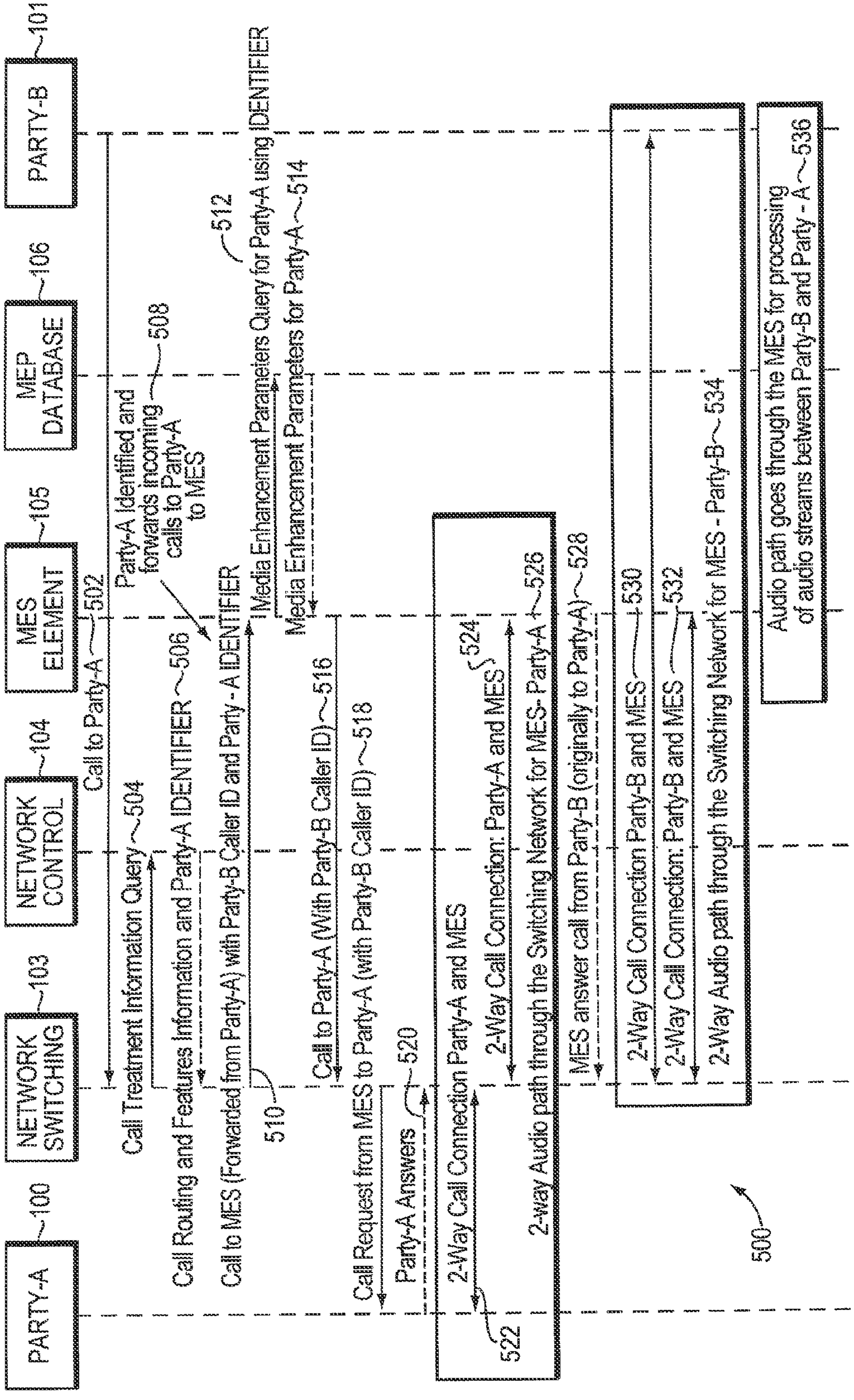
FIG. 5 illustrates a call flow sequence example for incoming calls connected through the Media Enhancement Function for the generalized network architecture of FIG. 1.

FIG. 5 depicts a call sequence 500 for the generalized network of FIG. 1 describing one exemplary embodiment of the invention to implement the personalized media enhancement service for incoming calls.

When Party-B (101) initiates a network connection request (a call) to Party-A (100) (Step 502) by signaling Party-A's (100) network address (for example the telephone number) to the Network Control (104) over communication link (110) (Step 504), the Network Control (104) determines the routing for the call from Party-B (101) to Party-A (100) and also procedures to implement features enabled for Party-A (100) (Step 506). Party-A (100) may be identified by the network by means including the telephone number or network address associated with Party-A (100), a serialized code (e.g., a MAC (Media Access Control) address or an IMSI (International Mobile Subscriber Identifier) used in cellular devices) associated with the device of Party-A (100) transmitted during call set up, or any other method which provides an identifier used to identify the person, device, or access line associated with Party-A (100) that is used by the Network Control (104) to identify that the call has the media enhancement service activated and thus Party-A's (100) incoming call from Party-B (101) is routed (or forwarded) to the MES (105) (Step 508).

The Network Control (104) implements a connection request (a call) to the MES (105) with the parameters in the connection request including the Party-A (100) network address (e.g., telephone number) (the final destination for the call), other Party-A (100) identifier to be used by the MES (105), and Party-B's (101) network address (e.g., Party-B's (101) telephone number), and an indication that the connection request is to be connected through the MES (105) and then to Party-A (100) (Step 510). The signaling and methods for call routing, or call forwarding, features are well known to those skilled in the art of telecommunications networks.

When the MES (105) receives the call request from the Network Control (104) for the call from Party-B (101), the MES (105) then sends a query message to the MEP (106), including the identifier associated with Party-A (100), to request the personalized audio processing parameters for Party-A (100) (Step 512). These parameters are looked up by the MEP (106) using well known database methods and then transmitted from the MEP (106) to the MES (105). The MES (105) then configures an audio processing function, or set of functions, based on the parameters obtained for Party-A's (100) specific hearing needs. This personalized audio processing function will be applied to the audio media sent to Party-A (100) during the network connection (Step 514).

Next, the MES (105) sends a call request message to Party-A (100) through the Network Control (104) (Step 516). Although not necessary for the media enhancement service operation, in a preferred embodiment, the call request from the MES (105) to Party-A (100) will include the Caller-ID (telephone number, network address, or other identifier) of Party-B (101). The techniques to implement the call request and set the Caller-ID of the calling party to be Party-B (101), rather than the telephone number associated with the MES (105), are well known to those skilled in the art of telecommunications.

Before, at the same time, or after the MES (105) sends the call request to Party-A (100) through the Network Control (104), the MES (105) sends a "call alerting" message to Party-B (101), through the Network Control (104), to inform Party-B (101) that Party-A (100) is being alerted to the call from Party-B (101) (Step 518). In most telecommunications networks, Party-B (101) will receive the "call alerting" message and generate a signal (e.g., audible ringing) to be received by the person at Party-B (101) to indicate Party-A (100) is being alerted to the call request from Party-B (101).

When Party-A (100) accepts the call (Step 520), Party-A (100) sends a "call accepted" message to the MES (105) through the Network Control (104). Before, at the same time, or after the "call accepted" message by Party-A (100) is sent to the MES (105) through the Network Control (104) (Step 522), the Network Control (104) sends a message to the Network Signaling and Transmission (103) to establish an audio path (e.g., a voice trunk) between the MES (105) and Party-A (100) (Step 524) through the Network Switching and Transmission (103) (concluded at Step 526).

After the MES (105) receives the "call accept" message from Party-A (100), the MES (105) sends a "call accept" message to Party-B (101) through the Network Control (104) in response to the original call request received from Party-B (100) (Step 528). Before, at the same time, or after the "call accept" message is sent from the MES (105) to Party-B (101) through the Network Control (104) (Step 530), the Network Control (104) sends a message to the Network Signaling and Transmission (103) to establish an audio path (e.g., a voice trunk) between the MES (105) (Step 532) and Party-B (101) through the Network Switching and Transmission (103) (Step 534). The two-way audio path between Party-B (101) and Party-A (100) is routed through the MES (105) (concluded at Step 536). The MES (105) uses audio processing functions to enhance the audio transmitted to Party-A (100).

The processes for making call requests, the ensuing call accept messages, and setting up audio connections are well known to those skilled in the art of telecommunications. The invention uses these well known processes to implement the media enhancement service with call connections routed through the MES (105) to provide personalized audio processing which is enabled during telephone connections.

Timing to Obtain Personalized Audio Processing Parameters

In another embodiment of the invention, the MES (105) obtains the personalized audio processing parameters for calls routed through the MES (105) before the call occurs. This could occur during the provisioning process, during normal network information updates, or any other method.

In another embodiment of the invention, the MES (105) obtains the personalized audio processing parameters for the call after the call connection (i.e., audio streams) starts. The MES (105) then configures an audio processing function, or set of functions, based on the personalized parameters obtained for Party-A's (100) specific hearing needs. This personalized audio processing function will be applied to the audio media sent to Party-A (100) during the network connection.

Timing to Enable Personalized Audio Processing Function

In another embodiment of the invention, the MES (105) is configured or enabled with personalized audio processing parameters for calls routed through the MES (105) before the call is set-up. In another embodiment of the invention, the MES (105) is configured or enabled with personalized audio processing parameters for calls routed through the MES (105) after the call is set-up.

All Calls Routed Through the Mes (105)

In another embodiment of the invention the MES (105) exists either physically, or logically, between the end users receiving the media enhancement service such that all incoming and/or outgoing calls for end users subscribed to the media enhancement service are carried through the MES (105) element without call routing logic required in the network. In this embodiment of the invention, all of Party-A's (100) calls (incoming and/or outgoing) are routed through the MES (105) and during, or after, call set-up Party-A (100) is identified either by the person establishing the call from Party-A (100) (e.g., user code, voice recognition), the device used by Party-A (100), or the access line used by Party-A (100), then the MES (105) is configured and enabled and the personalized audio processing parameters associated with Party-A (100) are used. In this embodiment of the invention the type of network architecture is in use for premises based PBX systems and key systems. This architecture can also be implemented in any network which provides audio processing capabilities such as IMS-MRFP (Media Resources Function Processors) for all calls carried in the network.

Telephone Device as the Media Enhancement Server

In another embodiment of the invention, a telephone device (e.g., a cellular handset, an IP telephone) provides the media enhancement features. Similar to the network based media enhancement service descriptions, in this embodiment of the invention using a telephone device to implement the media enhancement features, the telephone device will receive the audio processing parameters from the provisioning server, or another system that generates the personalized audio processing parameters, and then the media enhancement service is implemented in the telephone device. The personalized audio processing feature could then be controlled locally (enabled or disabled) by the user of the telephone device.

Telephone Device as the Provisioning System and the Media Enhancement Server In another embodiment of the invention, in addition to the telephone device including the media enhancement features (as described previously), the telephone device also includes an application to provide provisioning server features. An example of such a feature is described as follows.

The telephone device user selects to start an application which has been installed into the telephone device. Installing and accessing applications into telephone devices is well known to those skilled in the art of telephone device programming. The application presents hearing related tests as previously described to find the preferred parameters for one or multiple audio processing functions (MEFs). For example, passages of spoken speech with different equalizer settings are played to the telephone device's speaker and the user is asked which passage is preferred. The parameters associated with the passage of speech selected are then selected as the parameters for an equalizer MEF and the parameters are stored and then used to process the audio received. In other embodiments of the invention, any other methods may be used to locally (on the telephone device) obtain personalized audio processing parameters to improve the intelligibility, or quality, of the audio signal heard by the user of the telephone device.

Dynamic Processing of the Audio Signal Based on Noise

In another embodiment of the invention, in the case where Party-A (100) has the MES (105) audio processor enhancing the audio sent from Party-B (101) to Party-A (100), the audio processing parameters used by the MES (105) are selected, or modified, dynamically based on the MES (105) analyzing the noise received in the audio stream from Party-A which indicates the "room noise" or noise in the environment in which the media enhancement service user is listening.

In another embodiment of the invention, the audio processing parameters used by the MES (105) are selected, or modified, dynamically based on the MES (105) analyzing the noise received from Party-B (101).

In another embodiment of the invention, the audio processing parameters used by the MES (105) are selected, or modified, dynamically based on analyzing the noise from Party-A (100) and the noise from Party-B (101).

Network Features and Operations

A network connection, or call, is comprised of three stages, 1) network connection set up, 2) network connection control, and 3) network connection media transport. During set-up, call routing and call related information is assembled and transmitted within the network to establish the desired call connection. During control, the network connection may be configured via interaction of network entities that may occur during set-up or after the connection is established. Media transport is what occurs after the call is set-up and the media of the call (e.g., audio) is transmitted thorough network elements between end-points.

The previous descriptions provided network connection routing and call set-up sequences and timings for embodiments of the invention. Other embodiments of the invention control enabling and disabling the MES (105), routing, or not routing calls to the MES (105), or configuring the MES (105) audio processing parameters, during any of the three stages of the network connection including 1) network connection set up, 2) network connection control, and 3) network connection media transport.

Other embodiments of the invention use different methods for network connection set-up and connection control with the result being network connection audio is passed through the MES (105) and personalized audio processing is applied to the audio stream sent to the media enhancement service user.

Other embodiments of the invention use call routing, call control, direction of the call media through the MES (105), and retrieval of parameters by the MES (105), occurring through interactions with any features or functions provided by any network element including any of call forwarding, call acceptance, call redirection, call deflection, SIP control functions, SIP proxy operation, Media Gateway operations, settings associated with an application server, settings associated with a central switching office, an IMS Call Session Control Function (CSCF), an IMS Application Server (AS) (e.g., a SIP-AS), an IMS Voice Call Continuity (VCC) server, an IMS Media Resource Function (MRF) server, an IMS Open Services Access Gateway (OSA-GW), an IMS Back-to-Back User Agent (B2BUA), a Home Subscriber Server (HSS), a telephone exchange, a Mobile Switching Center (MSC) or MSC Server, Customized Applications for Mobile networks Enhanced Logic (CAMEL), Intelligent Network (IN) features, Advanced Intelligent Network (AIN) features, Service Switching Point (SSP) (AIN), Intelligent Peripheral (IP) (AIN), Service Control Point (SCP) (AIN), Signal Transfer Point (STP) (AIN), INAP, JAN, JAIN-SIP, OSA/Parlay APIs, Parlay X, an http or web server, use of the settings associated with call or session routing in either the network element or in another route or switch controlling network element.

Operates within any Type of Network

Embodiments of the invention may be configured in any variety of telecommunication networks, including but not limited to a closed or private network (e.g., a LAN), a public network (e.g., the PSTN), and any combination of interconnected networks where terminated, originated, or routed network connections, and the different parts of the process of network connection (set up, control, media transport) may be carried over any network, and any combination of networks, including: Public Switched Telephone Network (PSTN), Integrated Services Digital Network (ISDN), IP Multimedia Subsystem (IMS) network, Public Voice over IP (VoIP) network, Private Voice over IP (VoIP) network, Wireless network, Private LAN based network, Cable-based network, Multimedia network.

Embodiments of the invention may operate using any type of transmission and switching types for network connection set up, control, and media transport including but not limited to packet switched, circuit switched, land based (i.e., wire, cable, optical, etc.), and air based (i.e., wireless).

Multiple Protocols

Embodiments of the invention may be implemented within any network type, using any protocols for network connection set up, control, and media transport including but not limited to Internet Protocol (IP), Session Initiation Protocol (SIP), Media Gateway Control Protocol (MGCP), Asynchronous Transfer Mode (ATM), Frame Relay (FR), Signaling System 7 (SS7), ICMP/ICMPv6 Internet Control Message Protocol, IGMP Internet Group Management Protocol, IP Internet Protocol version 4, IPv6 Internet Protocol version 6, MARS Multicast Address Resolution Server, PIM Protocol Independent Multicast-Sparse Mode (PIM-SM), RIP2 Routing Information Protocol, RIPng for IPv6 Routing Information Protocol for IPv6, RSVP Resource ReSerVation setup Protocol, VRRP Virtual Router Redundancy Protocol, ISTP, Mobile IP Mobile IP Protocol, RUDP Reliable UDP, TALI Transport Adapter Layer Interface, TCP Transmission Control Protocol, UDP User Datagram Protocol, Van Jacobson compressed TCP, XOT X.25 over TCP, BGMP Border Gateway Multicast Protocol, Diameter, ISAKMP/IKE Internet Security Association and Key Management Protocol and Internet Key Exchange Protocol, iSCSI Small Computer Systems Interface, LDAP Lightweight Directory Access Protocol, MZAP Multicast-Scope Zone Announcement Protocol, NetBIOS/IP NetBIOS/IP for TCP/IP Environment, COPS Common Open Policy Service, FANP Flow Attribute Notification Protocol, Finger User Information Protocol, FTP File Transfer Protocol, HTTP Hypertext Transfer Protocol, IMAP4 Internet Message Access Protocol rev 4, IMPPpre/IMPPmes Instant Messaging and Presence Protocols, IPDC IP Device Control, IRC Internet Relay Chat Protocol, ISAKMP Internet Message Access Protocol version 4 rev-1, ISP, NTP Network Time Protocol, POP3 Post Office Protocol version 3, Radius Remote Authentication Dial In User Service, RLOGIN Remote Login, RTP Real-time Protocol, RTSP Real-time Streaming Protocol, SCTP Stream Control Transmission Protocol, S-HTTP Secure Hypertext Transfer Protocol, SLP Service Location Protocol, SMTP Simple Mail Transfer Protocol, SNMP Simple Network Management Protocol, SOCKS Socket Secure (Server), TACACS+ Terminal Access Controller Access Control System, TELNET TCP/IP Terminal Emulation Protocol, TFTP Trivial File Transfer Protocol, WCCP Web Cache Coordination Protocol, X-Window.

Integration with any Network Element

Embodiments of the invention may implement the MES (105), the MEP (106), and the PS (107) as stand-alone discrete elements or these elements may be integrated with other network elements including but not limited to each other, an Application Server (AS), A SIP Application Server (AS), a Voice Call Continuity (VCC) server, a Media Resource Function (MRF) server, a Media Gateway Function (MGW), an Open Services Access Gateway (OSA-GW), a Back-to-Back User Agent (B2BUA), a Call Session Control Function (CSCF), a Home Subscriber Server (HSS), a Mobile Switching Center (MSC) or MSC Server, Customized Applications for Mobile networks Enhanced Logic (CAMEL) server, Service Switching Point (SSP) (AIN), Intelligent Peripheral (IP) (AIN), Service Control Point (SCP) (AIN), Signal Transfer Point (STP) (AIN), a telephone exchange, a voicemail server, a web server, an Interactive Voice Response (IVR) system.

Integration with any Network Function

Embodiments of the invention may implement the MES (105), the MEP (106), and the PS (107) as stand-alone elements or these elements may be integrated with other network functions including but not limited to termination of network connection requests from a user, termination of network connection requests to a user, routing of network connections to a user, routing of network connection requests from a user, termination of network connections, interface to the core Internet Multimedia Subsystem (IMS) network, interface to the core Internet Multimedia Subsystem (IMS) network using Parlay, transcoding of the media stream, testing, tuning, and/or optimization functions to determine media enhancement function parameters, storage of tuning or optimization parameters to be used in a media enhancement function, retrieval of tuning or optimization parameters to be used in a media enhancement function, allowing user input for the enabling or disabling of features.

Audio Processing

Embodiments of the invention may be implemented with the MES (105) including audio processing functions including fixed gain, equalization, automatic gain control (AGC), compression, companding, frequency band limiting, frequency shifting, speech intelligibility enhancement, energy redistribution, time constant functions, noise cancellation, noise reduction, dynamic configuration based on noise, or any audio processing technique which may be used to enhance the audio signal. Alternatively, the MES (105) may be implemented as a stand alone function.

Identifiers

The identification of the end-point that will have its received audio enhanced by the MES (105) is important. The network may use the identifier to determine how to route calls to the MES (105). The identifier may also be used in the invention to determine which parameters to use for the MES (105) audio processing including enabling or disabling the MES (105), settings used by any of the audio processing functions, and retrieval of the audio processing parameters.

Embodiments of the invention may use identifiers that identify the originating or destination network access line, port, subscriber, etc. Access line and related identifiers used in embodiments of the invention may include, but are not limited to, MIN (Mobile Identity number), an IMSI, TMSI, a phone number, an IP address, an IP based URL, a SIP URI, a user name, a user selection, an account number, Caller Identification (Caller ID) or a subscriber identity indication, a virtual connection (VC), a connection identifier, line identification, or the like.

Embodiments of the invention may use identifiers that identify the originating or destination device. Device identifiers used in embodiments of the invention may include, but are not limited, to MIN (Mobile Identity number), an IMSI, TMSI, a phone number, an IP address, an IP based URL, a SIP URI, a device address or device serial number, a MAC address, a user name, a user selection, an account number, Caller Identification (Caller ID) or a subscriber identity indication, or the like.

Embodiments of the invention may use identifiers that identify the person for whom the parameters will be applied. Personal identifiers used in embodiments of the invention may include, but are not limited, user input or selection, a username, user identifier, and automatic speaker identification algorithms operated on the return media stream from the user (user speech).

Embodiments of the invention may use identifiers that identify a collection of a classification of users, devices, access lines, or other identifiers for which the MES (105) will provide audio enhancement features.

Media Enhancement Features without Call Routing

In another embodiment of the invention, Party-A's access line connects through the MES (105) such that by nature of the connectivity of Party-A the audio path of Party-A to the Network Switching will pass through the MES so there is no need to route incoming or outgoing calls through the network to the MES. Examples of a fixed pass through architecture include when the MES is part of the Party-A's telephone device, an adjunct device connected between Party-A and the Network Switching, a "hotline" feature, and an element of the Network Switching which connects to Party-A without call routing required. The invention works whether Party-A's calls are routed to the MES (105) on a per call basis or if all of Party-A's calls are connected through the MES (105).

Ordering of Media Enhancement Service Operations

In another embodiment of the invention, Party-A's calls are routed to the MES (105), but the audio processing parameters are determined after the call connection is established. This change in operation may occur to hasten call connection timing, or it may be used to enable the use of voice recognition for the MES to identify the person connected on a call and then retrieve the personalized audio processing parameters for the person identified.

The order of network signaling messages and connections is not important for the operation of the invention and use of the MES (105). The invention only requires having the audio stream of Party-A's received audio being routed through the MES (105) and for the MES (105) to have a means to identify the party associated with network connection to obtain and/or apply the personalized audio processing parameters associated with that party.

Control Based on Detection of Media Type

In another embodiment of the invention, the MES (105) may detect the type of audio media present in the audio stream of the connection and based on personalized media enhancement parameters, the audio processing may be enabled or disabled. For example, the MES (105) may be enabled if speech or music is detected, but disabled if data (e.g., modem signaling) is detected.

In another embodiment of the invention, call routing is determined by identifying the audio media type being speech, music, or data.

In another embodiment of the invention, the call media may include a mixed media type (e.g., audio and video). In this embodiment, the audio stream would pass through the MES and the video stream would be rejoined with the audio stream as the entire media transmission is transmitted to the destination.

Operation with Recording Devices and Non-Real-Time Operation

In another embodiment of the invention, the endpoint may be a non-live person but a recording device, or system. The MES (105) will still perform the audio processing but the speech will be transmitted to the voice recording system (e.g., answering machine or voicemail).

In another embodiment of the invention, the MES (105) works in conjunction with an audio recording system (e.g., an answering machine, or voicemail) and the audio processing of the MES (105) is applied in non-real time to the recorded audio that will eventually be heard by the intended listener.

Configuration Based on Noise Classification

In another embodiment of the invention, the MES classifies noise included in the audio stream of the connection. The "near-end" is defined as the end-point for which the media enhancement feature is processing the audio to be heard. The "far-end" is defined as the end-point to which "near-end" is connected for the call. In this embodiment of the invention, the MES (105) analyzes the noise included in the audio signal transmitted from the far-end to the near-end. The type or parameters of the noise is be determined by ascertaining the voice codec (vocoder) in use, analyzing the spectral content, or using autocorrelation techniques on the audio signal, or any other methods. In this embodiment, the audio processing parameters of the MES (105) are modified based on specific determinants of the noise analysis.

In another embodiment of the invention, the MES (105) analyzes the noise signal received in the audio stream transmitted from the near-end to the far-end. In this case this noise represents the noise environment of the location of the endpoint for which the personalized audio processing media is transmitted to. In this embodiment, the audio processing parameters of the MES (105) are modified based on specific determinants of the near-end noise analysis.

Works with any Audio Coding Method

The invention will operate using any type of coding scheme used for the audio transmission including but not limited to G.711, G.729 A, B, AB, D, G.723.1, G.726, G.728, H.323, G.722, G.722.1, G.722.2 (AMR-WB), L16-256, digital narrow band, digital wide band, analog narrow-band, analog wide-band, or any other coding method used.

User Inputs to Control Media Enhancement Functions and Call Routing

In another embodiment of the invention, the user of the media enhancement service provides input to enact personalized control of the MES (105) parameters including enabling and disabling the audio processing, and controlling specific parameters of the audio processing for example gain, equalization, and AGC.

In another embodiment of the invention, the user of the media enhancement service provides inputs during call set-up to control whether the call is, or is not, routed through the MES (105) or the MES (105) is enabled or disabled. The user input can be on a per-call basis, or as a setting that may be turned on or off by the user.

User inputs for media enhancement service control and call routing may be via any other network connection and input methods including DTMF in-band of the audio stream, DTMF to a server for configuration on a call not associated with the audio stream, out-of-band signaling associated with the call (e.g., SIP control messages, user-to-user signaling), control via an interface that is not directly associated with the call (e.g., a web interface to an MES control feature), via an operator acting on behalf of the users requests, or any other method by which the user may signal to control the media enhancement service audio processing parameters and call routing. The user control inputs may be signaled from the user at any time before or during an audio network connection that uses the media enhancement function including before or during network connection set up, and before or during network connection media transport.

In another embodiment of the invention, the media enhancement service is offered as a service which the user may register for by any method including access to a webpage to opt-in or opt-out of the service, access to a telephone number (call) to opt-in or opt-out of the service, access to a webpage to register for the service including entering of user contact information which may consist of one or more of: email address, phone number, address, telephone device number, user name, password, and the like, the user calling a telephone number and providing information which may consist of one or more of: email address, phone number, address, telephone device number, user name, password, and the like, and parameters associated with a server providing billing services is modified based upon use or registration, or data otherwise entered as part of a registration process.

Integration with Hearing Test Functions

The invention may be implemented with the MES (105) or MEP (106) functions integrated on the same element with functions used for testing the hearing of users including single or multiple combination of: audiogram testing, hearing intelligibility testing, speech intelligibility testing, hearing tuning testing, hearing optimization testing, signal-to-noise (SNR) response testing, speech intelligibility testing with noise testing, phonetic recognition testing, stimulus and response based testing, and collection of user related data including age, gender, occupation, known hearing issues, and the like.

Tuning and Optimization Parameters

The invention uses the parameters determined by a hearing test to tune, or optimize, an audio processor that is used to provide the media enhancement functions. These parameters may be retrieved at any time including: before a network connection occurs, before a network connection is received by the media enhancement element, during the process of a network connection set-up, an after a network connection has been set up or established.

The invention uses an audio processor for which the tuning and optimization parameters may be stored in any format and the parameters may be retrieved by the MES (105) from any location accessible to the media enhancement element including: a database, any type of computer file, on the same element as the MES (105), on an element connected to the same network, on an element connected to a remote network.

The invention uses storage of tuning or optimization parameters to be used in media enhancement functions which may associated with any identification means including: storage associated with a device identity, storage associated with a line, or access subscriber identity, and storage associated with a person's identity.

Media Enhancement Service in an AIN or IN Architecture

FIG. 2 depicts the elements of the Public Switched Telephone Network (PSTN) and the connectivity architecture. The majority of the PSTN is connected and controlled with network elements and architectures based on the Advanced Intelligent Network (AIN) or the Intelligent Network (IN). Call flows for call connections are well known to those skilled in the art of the PSTN, AIN and IN. Call flows and connections for implementations of call forwarding and call routing features are also well known to those skilled in the art of the PSTN, AIN and IN. AIN features are implemented using scripts contained in the SCP (Signaling Control Point) (211, 212, 213, 214). In one embodiment of the invention, a subscriber's service would be configured with an AIN call routing feature to route all outgoing calls to the MES (216), and an AIN selective call forwarding feature to forward all calls to the subscriber except for calls from the MES (216). Call routing and call forwarding features are well known to those skilled in the art of the PSTN, AIN and IN.

FIG. 2 depicts the MES connectivity to the PSTN through two possible routing paths. One route, is a direct connection over PSTN trunks (250 and 258) which may be implemented for example, with ISDN (PRI), T1, or other PSTN circuit switched connections. Another route is through the IP-CS Gateway (218) which then connects to the MES through an IP (packet) network (for example the Internet) to the MES (216). In either routing connectivity, from the user's perspective (for example Party-A (221)) the service provided operates such that outgoing calls are routed through the MES (216) (either direct circuit switched network or through a gateway and packet network) and then the call is completed to its intended destination. Likewise, incoming calls are forwarded to the MES (either direct circuit switched network or through a gateway and packet network) and then the call is completed to the service subscriber (for example, Party-A (221)). Different embodiments of the invention may be implemented using any type of network architecture that provides a path for a call's audio media to go through the MES and provides a method for routing the calls to the intended destination.

Figures 6, 6A:
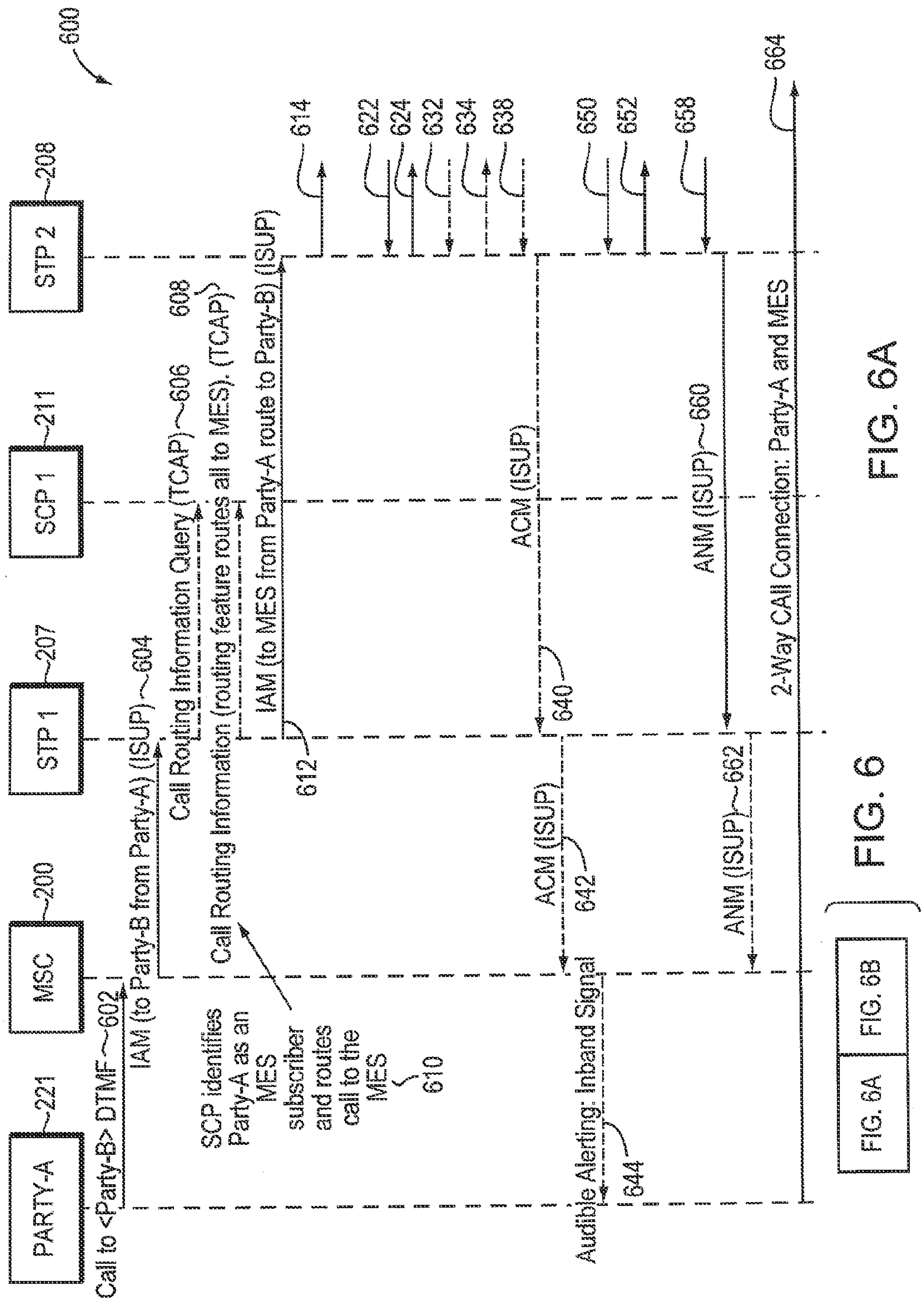
FIG. 6 illustrates a call flow sequence example for outgoing calls connected through the Media Enhancement Function for the AIN network architecture in FIG. 2.
Figure 6B:
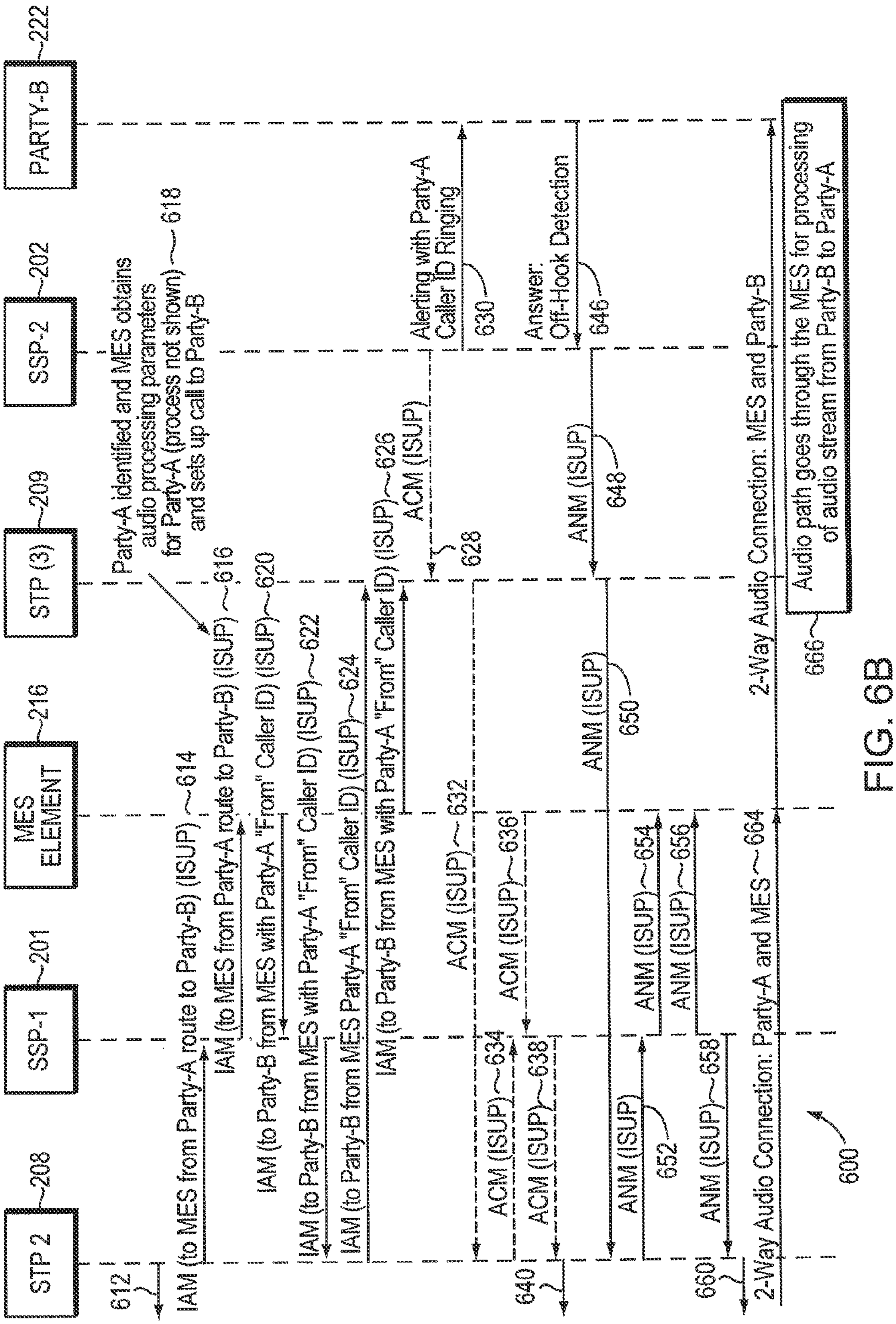
Figures 7, 7A:
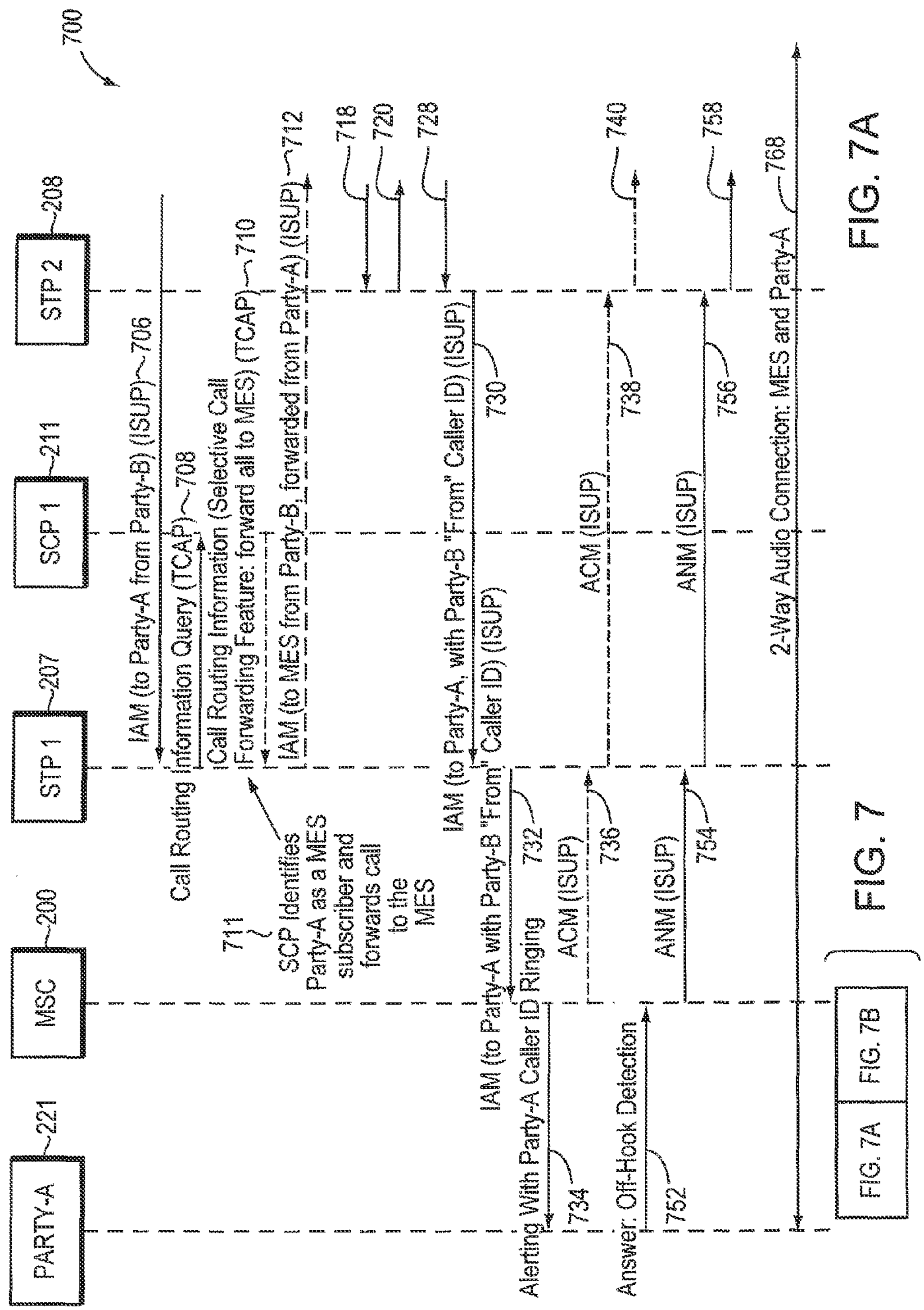
FIG. 7 illustrates a call flow sequence example for outgoing calls connected through the Media Enhancement Function for the AIN network architecture in FIG. 2.
Figure 7B:
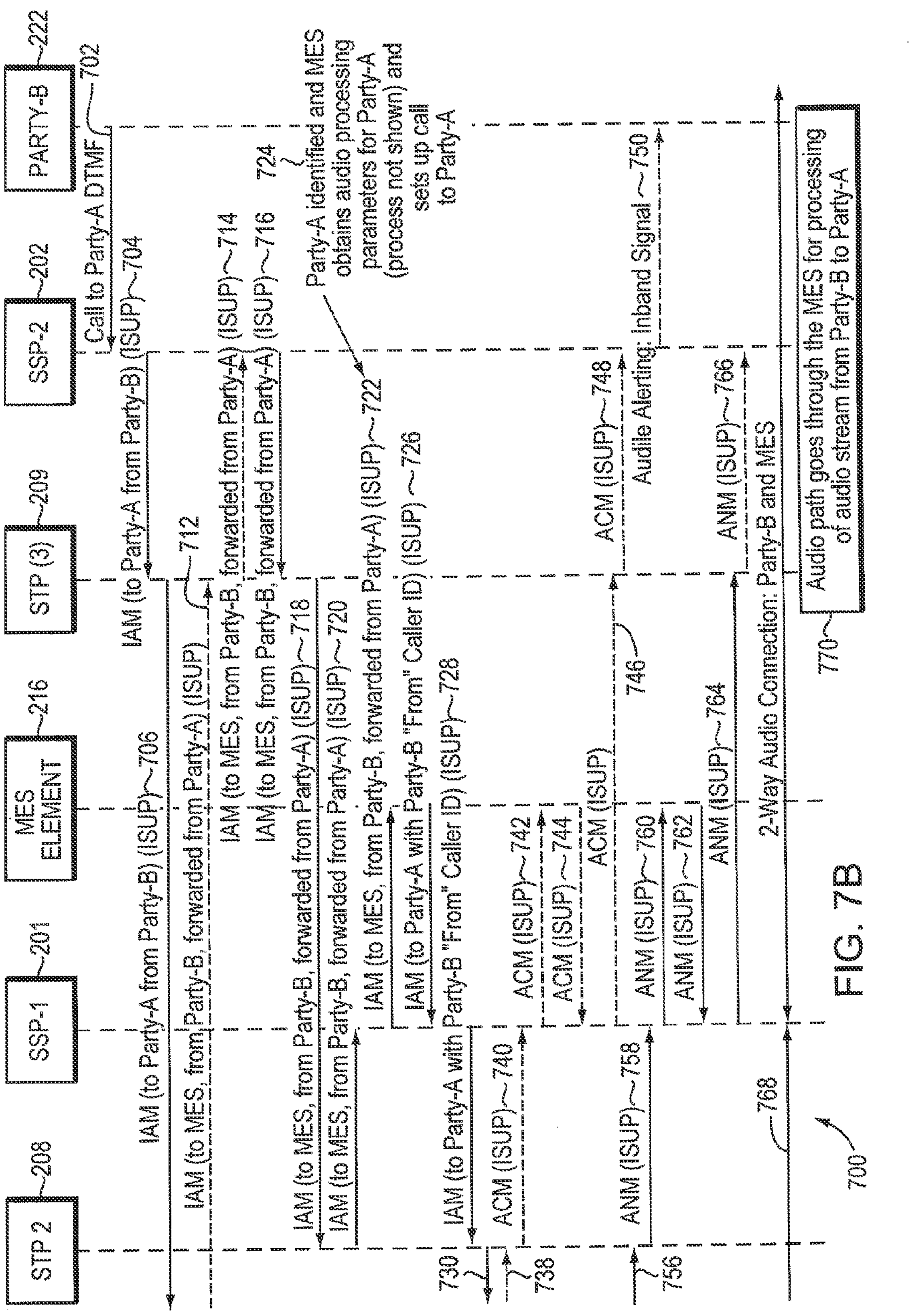

For the case of call flows for a network architecture using an IP based MES (216), FIG. 6 and FIG. 7 would be modified by the MES element being replaced with the connection of the IP-CS Gateway (218), the IP Network (217), and the MES (216). The associated call setup signaling (for example SIP) to connect calls through the IP-CS Gateway (218) and then through the MES (216) is well known to those skilled in the art of circuit switched, packet switched, and circuit-to-packet switched networking.

Outgoing Call in an AIN Architecture

FIG. 6 depicts a call flow diagram for one embodiment of the invention for outgoing calls routed through a Media Enhancement Server (216) in an AIN architecture with connectivity using circuit switched trunks (600). The feature implementation is similar to that described previously for the generalized network of FIG. 1 and the related call flows depicted in FIG. 4 for outgoing calls. In this embodiment of the invention, the subscriber (Party-A (221)) has a call routing feature implemented such that all outgoing calls are routed to the MES (216) and then the final destination. AIN provides a set of features that may be used for implementing outbound call routing.

When Party-A (221) initiates a network connection request (a call) to Party-B (222) through an MSC (200) (Step 602) by signaling Party-B's (222) network address (for example the telephone number) through an STP (207)(Step 604) to an SCP (211)(Step 606), the SCP sends call routing information to the STP (207)(Step 608) and identifies Party-A (221) as an MES subscriber (Step 610). STP (207) then signals STP (208) (Step 612) which connects to an SSP (201)(Step 614) which connects to an MES Element (216)(Step 616). At this point, the MES (216) identifies Party-A and obtains audio processing parameters for Party-A and sets of the call to Party-B (Step 618). The MES (216) then sends the identifier of Party-A (221) to SSP (201)(Step 620) which sends it to STP (208)(Step 622). STP (208) then routes the call to STP (209) (Step 624) through SSP (202)(Step 626) and alerts Party-B (222) with the identifier of Party-A (221) by ringing (Step 630). Audible alerting is then routed back to Party-A (221) (Step 628, Steps 632-644). When Party-B (222) answers the call, off-hook detection is routed to MSC (200)(Steps 646-662) and a 2-way audio connection is established between Party-A (221) and the MES Element (216) as well as between the MES Element (216) and Party-B (222)(Step 664). The audio path passes through the MES Element (216) for processing the audio stream from Party-B (222) to Party-A (221) (Step 666).

Outgoing call flows for calls routed to the MES (216) through a packet network are similar to the call flows in FIG. 6 except calls made directly to the MES are connected to the IP-CS Gateway (218) which then uses IP based call set-up signaling (for example SIP using INVITE messages) to complete the call to the MES (216). Likewise, the MES (216) would then set up calls by sending an INVITE message to the IP-CS Gateway (218) for calls whose final destination is on the circuited switched PSTN.

Incoming Call in an AIN Architecture

FIG. 7 depicts a call flow diagram for one embodiment of the invention for incoming calls routed through a Media Enhancement Server (216) in an AIN architecture. The feature implementation is similar to that described previously for the generalized network of FIG. 1 and the related call flows depicted in FIG. 5 for incoming calls. In this embodiment of the invention, the subscriber, Party-A (221), has a call forwarding feature implemented such that all incoming calls, except calls from the MES (216), are routed to the MES (216) and then to Party A (221). AIN provides a set of features that may be used for implementing selective call forwarding, or in general, inbound call routing.

When Party-B (222) initiates a network connection request (a call) to Party-A (221) through an SSP (202) (Step 702) by signaling Party-A's (221) network address (for example the telephone number) through an STP (209)(Step 704), the STP (209) contacts STP (207)(Step 706) which sends a call routing information query to SCP (211)(Step 708). SCP (211) indicates to STP (207) the selective call forwarding feature (Step 710) where Party-A (221) is identified as an MES subscriber and that the call is to be forwarded to the MES Element (216)(Step 711). The call is routed from STP (207) to the MES Element (216)(Steps 712-722) where the MES obtains audio processing parameters for Party-A (221) and sets up to call Party-A (221)(Step 724). MES Element (216) sends Party-B's (222) identifier to MSC (200)(Steps 726-732) which alerts Party-A (221) to Party-B's (222) identifier and rings Party-A's (221) phone (Step 734). An audible alert is routed from MSC (200) to Party-B (222)(Steps 736-750) to inform Party-B (222) that Party-A (221) has been alerted. When off-hook detection occurs for Party-A (221)(Step 752), MSC (200) signals to MES Element (216) the off-hook detection (Steps 754-760) which signals the detection event to SSP (202)(Steps 762-766). A two-way audio connection is established between Party-A (221) and the MES Element (216) and between the MES Element (216) and Party-B (222)(Step 768). The audio path passes through the MES Element (216) for processing of the audio stream from Party-B (222) to Party-A (221)(Step 770).

Incoming call flows for calls routed to the MES (216) through a packet network are similar to the call flows in FIG. 7 except calls made directly to the MES (216) are connected to the IP-CS Gateway (218) which then uses IP based call set-up signaling (for example SIP using INVITE messages) to complete the call to the MES (216). Likewise, the MES (216) would then setup calls by sending an INVITE message to the IP-CS Gateway (218) for calls whose final destination is on the circuited switched PSTN (for example, Party-A).

In one embodiment of the invention the MES (216) is connected to the PSTN over a PRI (Primary Rate Interface) or other type link providing out-of-band call signaling and control using ISDN and SS7 call set-up and call control protocols.

Other embodiments of the invention may have the MES (216), MEP (215), and PS (219) connected to the network using other interfaces and other protocols including through a PSTN-to-IP gateway with the MES (216) connected to an IP network with an architecture as shown in FIG. 1.

Other embodiments of the invention may have the MES (216), MEP (215), and PS (219) combined into one physical element or any combination of the elements combined and the others separate.

Media Enhancement Service in an IMS Architecture

FIG. 3 depicts the elements of the IMS (IP Multimedia Subsystem) and the connectivity architecture. Call flows for call connections are well known to those skilled in the art of IP and IMS communications. Call flows and connections for implementations of call forwarding and call routing features are also well known to those skilled in the art of IP and IMS communications.

IMS features are implemented using information contained in the HSS (307) (Home Subscriber Server). Information in the HSS (307) includes call routing instructions for incoming and outgoing calls for each subscriber of the network services. Service control information in the HSS (307) may be controlled by several methods including directly by the AS (303) and other methods well known to those skilled in the art of IMS.

In one embodiment of the invention, a subscriber's service would be configured with a call routing feature to route all outgoing calls to the AS (303), and a selective call forwarding feature to forward all calls to the subscriber except for calls from the MES (216) to the AS (303). Call routing and call forwarding features are well known to those skilled in the art of IP and IMS communications.

Outgoing Call in an IMS Architecture

Figures 8, 8A:
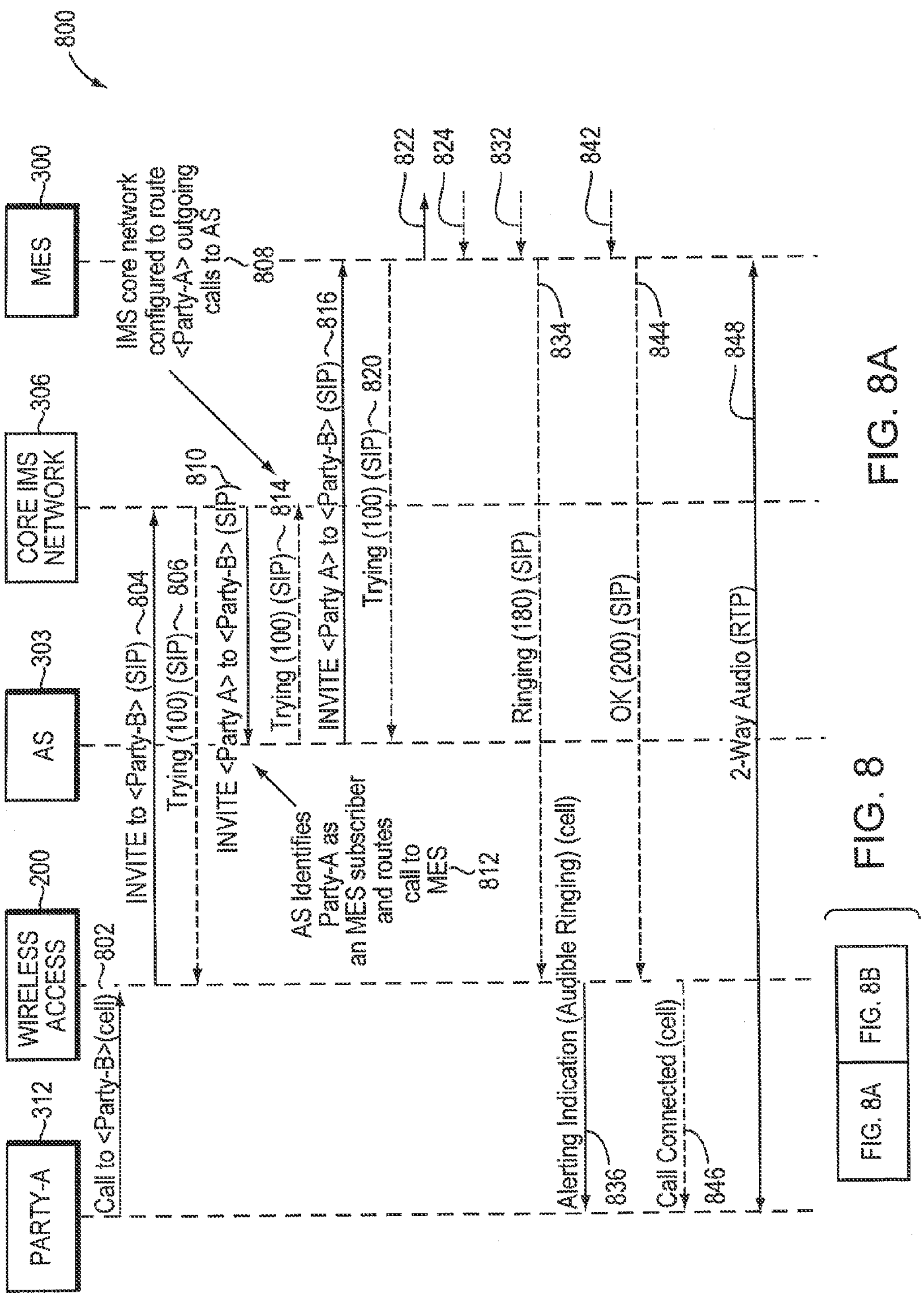
FIG. 8 illustrates a call flow sequence example for outgoing calls connected through the Media Enhancement Function for the IMS network architecture in FIG. 3.
Figure 8B:
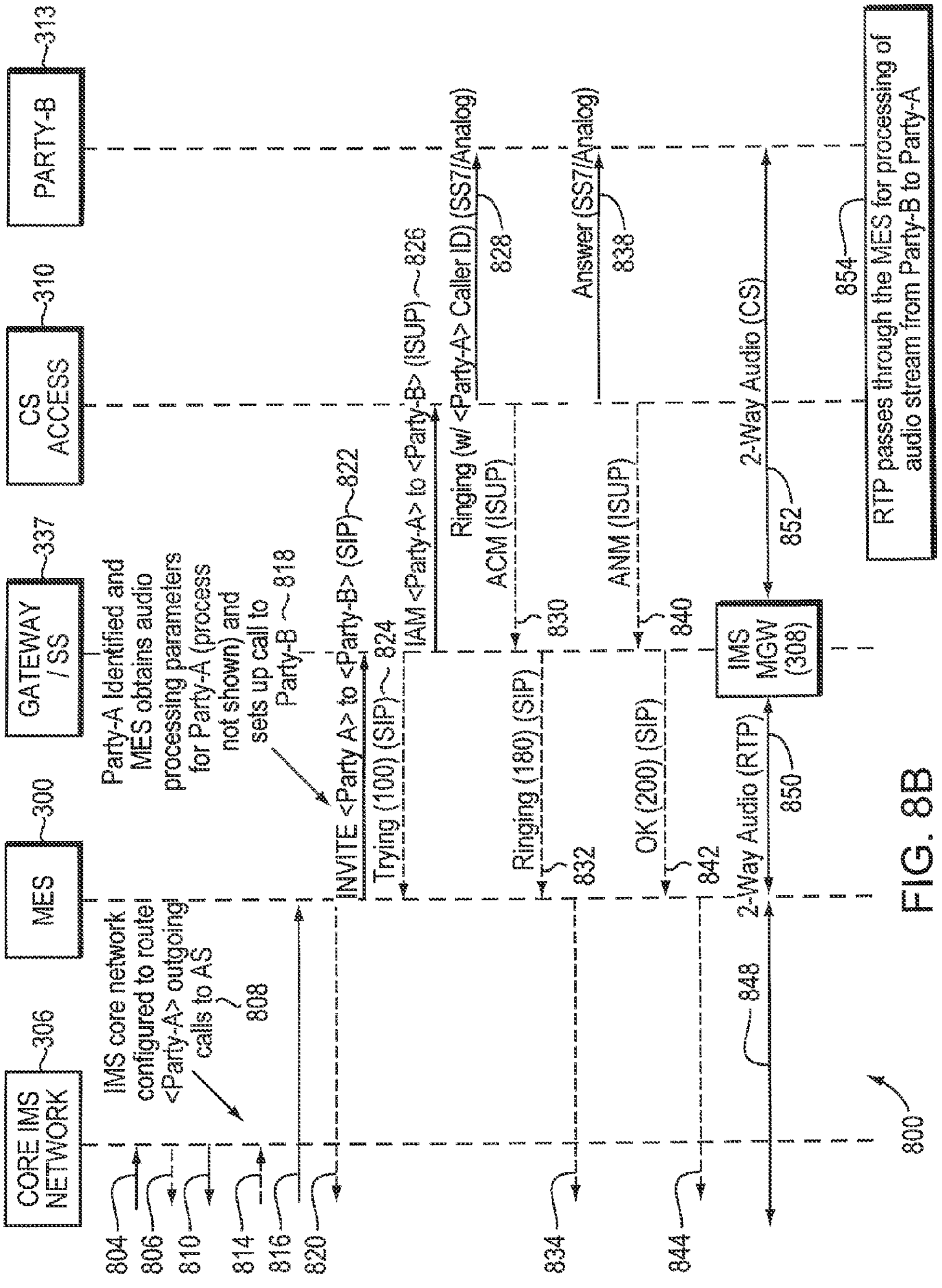

FIG. 8 depicts a call flow diagram for one embodiment of the invention for outgoing calls routed through a Media Enhancement Server (300) in an IMS architecture. The feature implementation is similar to that described previously for the generalized network of FIG. 1 and the related call flows depicted in FIG. 4 for outgoing calls. In this embodiment of the invention, the subscriber, Party-A (312), has a call routing feature implemented such that all outgoing calls are routed to the AS (303) and then the AS (303) routes the call to the MES (300) and then to the call is routed to the final destination. IMS provides a set of features that may be used for implementing outbound call routing features.

When Party-A (312) makes a call to Party-B (313), a request is sent to wireless access (200)(Step 802) which sends an invite to Party-B (313) via SIP to the core IMS network (306)(Step 804). The core IMS network (306) indicates to wireless access (200) that it is trying to establish the call (Step 806). The core IMS network (306) is configured to route Party-A (312) outgoing calls to AS (303)(Step 808). The core IMS network (306) signals AS (303) to invite Party-A (312) to Party-B (313)(Step 810). The AS (303) identifies Party-A (312) as an MES subscriber and routes the call to the MES (300)(Step 812). AS (303) signals to the core IMS network (306) that it is trying to connect the call (Step 814). AS (303) messages MES (300) of the invitation from Party-A (312) to Party-B (313)(Step 816). The MES (300) obtains audio processing parameters for Party-A (312) and sets up the call to Party-B (313)(Step 818). MES (300) signals to AS (303) that it is trying to connect the call (Step 820). The MES (300) sends an invite of Party-A (312) to Party-B (313) to a gateway/SS (337)(Step 822) which signals the MES (300) that it is trying to connect the call (Step 824). The gateway/SS (337) contacts a CS access (310) from Party-A (312) to Party-B (313)(Step 826) which transmits a ringing signal to Party-B (313) with the identifier of Party-A (312)(Step 828).

The CS access (310) signals back to Party-A (312) that Party-B (313) is ringing with an alerting indication (i.e., audible ringing) (Steps 830-836). When Party-B (313) answers, an answer signal is transmitted back to a CS access (310)(Step 838) to a gateway/SS (337)(Step 840) to a MES (300)(Step 842) to a wireless access (200)(Step 844) to Party-A (312)(Step 846). A 2-way audio path is created between Party-A (312) and an MES (300)(Step 848), between an MES (300) and an IMS MGW (308)(Step 850), and between an IMS MGW (308) and Party-B (313)(Step 852). Real-time packet data passes through the MES (300) for processing the audio stream from Party-B (313) to Party-A (312)(Step 854).

Incoming Call in an IMS Architecture

Figures 9, 9A:
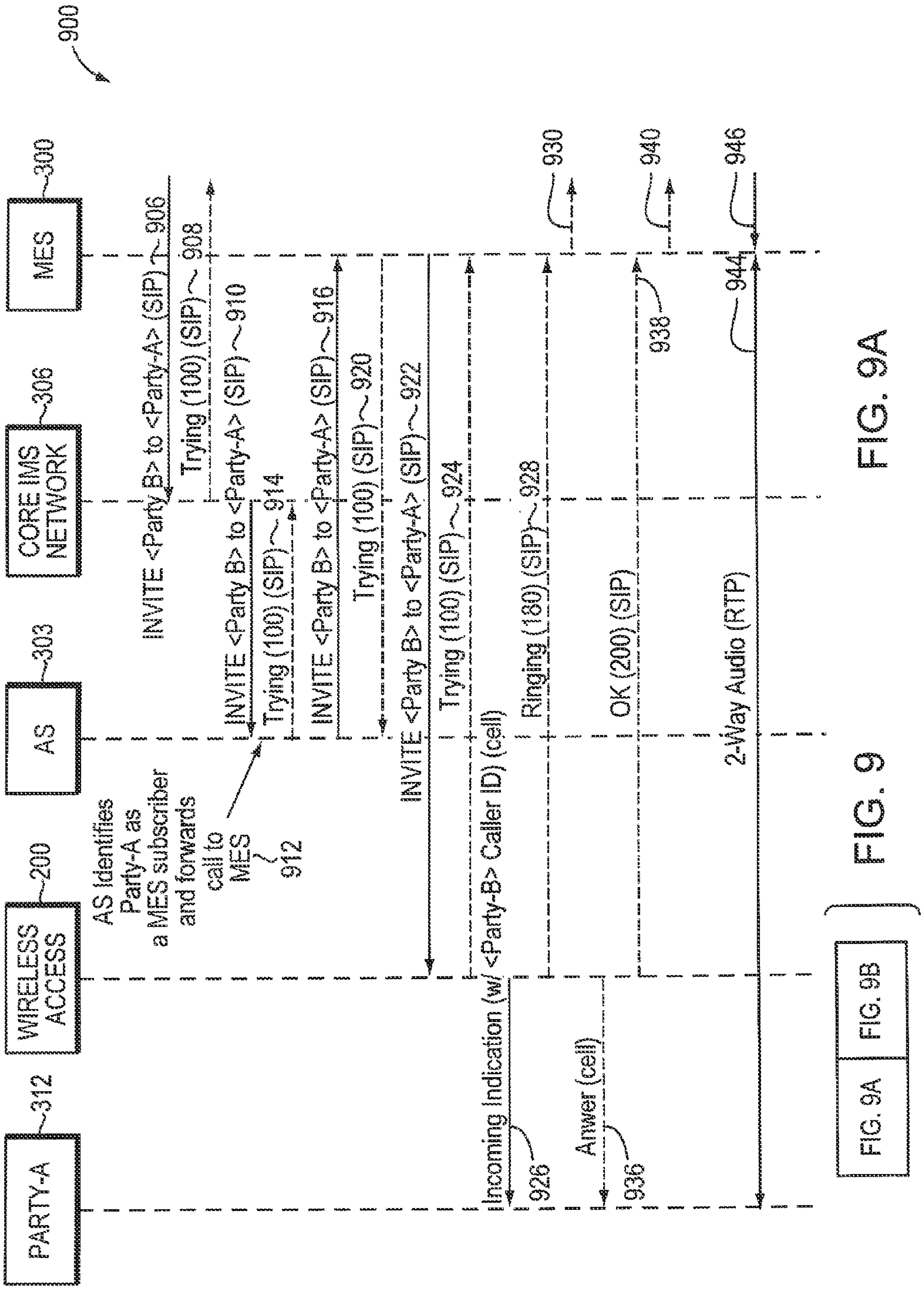
FIG. 9 illustrates a call flow sequence example for outgoing calls connected through the Media Enhancement Function for the IMS network architecture in FIG. 3.
Figure 9B:
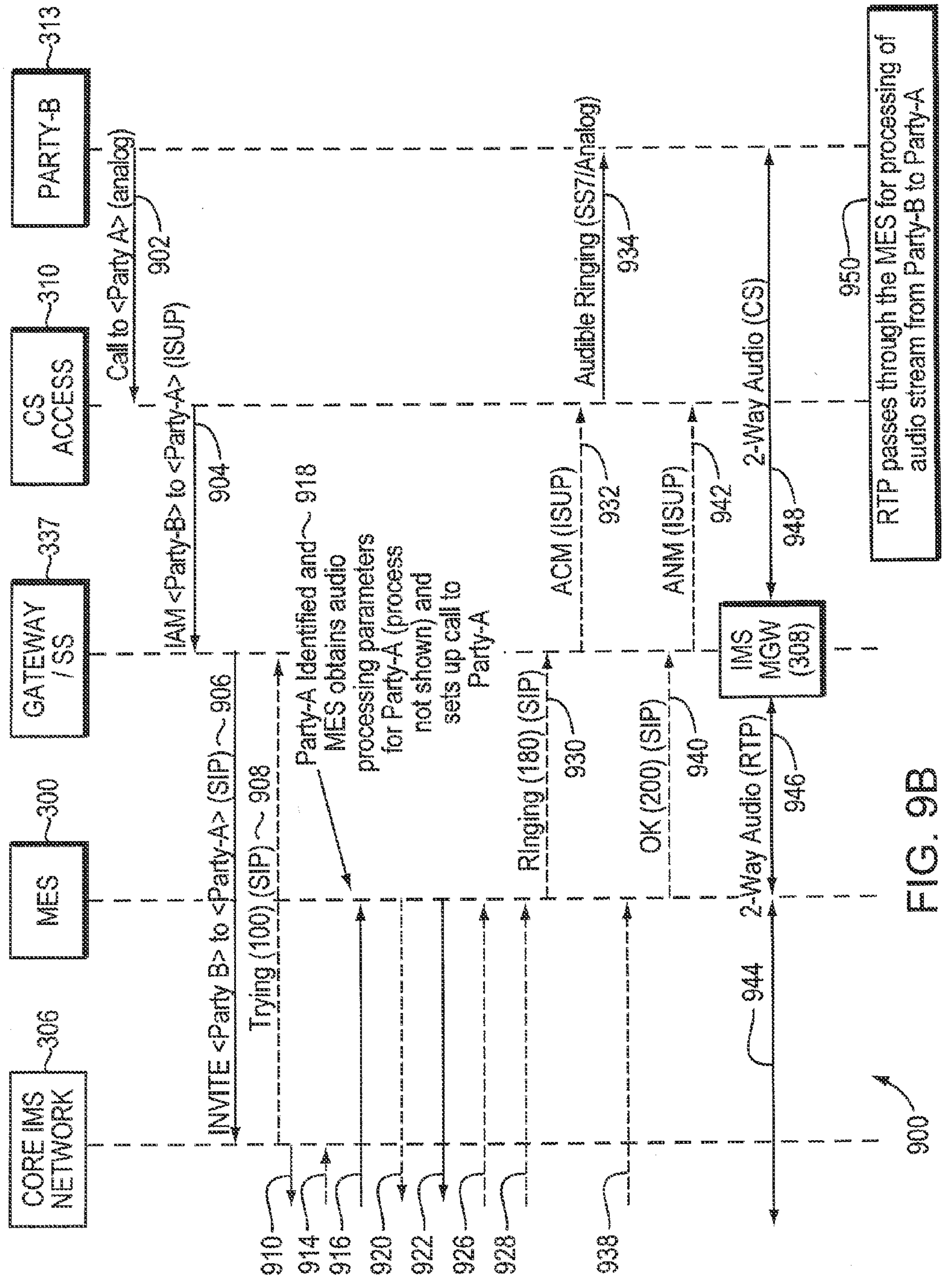

FIG. 9 depicts a call flow diagram for one embodiment of the invention for incoming calls routed through a Media Enhancement Server (300) in an IMS architecture. The feature implementation is similar to that described previously for the generalized network of FIG. 1 and the related call flows depicted in FIG. 5 for incoming calls. In this embodiment of the invention, the subscriber, Party-A (312), has a call forwarding feature implemented such that all incoming calls, except calls from the MES (300), are routed to the AS (303) and then the AS (303) routes the call to the MES (300) and then the call is routed to Party A (312). IMS provides a set of features that may be used for implementing selective call forwarding, or in general, inbound call routing features.

When Party-B (313) makes a call to Party-A (312), Party-B (313) signals to a CS access (310)(Step 902) which signals a gateway/SS (337)(Step 904). The gateway/SS (337) sends an invite of Party-B (313) to Party-A (312) to the core IMS network (306)(Step 906) which returns a signal to the gateway/SS (337) that it is trying to make the call (Step 908). The core IMS network (306) sends an invite of Party-B (313) to Party-A (312) to an AS (303)(Step 910). The AS (303) identifies Party-A (312) as an MES subscriber and forwards the call to the MES (300)(Step 912). The AS (303) returns a signal to the core IMS network (306) that it is trying to make the call (Step 914). The AS (303) sends an invite of Party-B (313) to Party-A (312) to an MES (300)(Step 916). The MES (300) identifies Party-A (312) and obtains audio processing parameters for Party-A (312) and sets up the call to Party-A (312)(Step 918). The MES (300) returns a signal to the AS (303) that it is trying to make the call (Step 920). The MES (300) sends an invite of Party-B (313) to Party-A (312) to a wireless access (200)(Step 922). The wireless access (200) returns a signal to the MES (300) that it is trying to make the call (Step 924). The wireless access (200) sends an incoming call indication and an identifier of Party-B (313) to Party-A (312)(Step 926). A ringing signal is then sent from the wireless access (200) to the MES (300)(Step 928) to a gateway/SS (337)(Step 930) to a CS access (310)(Step 932) to Party-B (313) which includes an audible ringing signal (Step 934). When Party-A (312) answers the call, an answer signal is sent from Party-A (312) to the wireless access (200)(Step 936). The wireless access (200) sends an answer signal (i.e., OK signal) to the MES (300)(Step 938) which sends the signal to a gateway/SS (337)(Step 940) which sends the signal to a CS access (310)(Step 942). A 2-way audio path is established between Party-A (312) and the MES (300)(Step 944), between the MES (300) and an IMS MGW (308)(Step 946), and between an IMS MGW (308) and Party-B (313)(Step 948). Real-time packet data passes through the MES (300) for processing of the audio stream from Party-B (313) to Party-A (312)(Step 950).

Other embodiments of the invention may have the AS (303), MES (300), MEP (304), and PS (305) connected to the network using other interfaces and other protocols.

Other embodiments of the invention may have the AS (303), MES (300), MEP (304), and PS (305) combined into one physical element or any combination of the elements combined and the others separate.

The provided embodiments enable customized network based audio processing to enhance an audio signal to improve the hearing acuity, comfort or listening effort of a specific listener or group of listeners. The network may be a telecommunications network, a PSTN network, an internet protocol (IP) network, a IMS network, a PacketCable Network, a wireless network, or other network capable of delivering audio or multimedia streams containing audio to a specific intended device, listener or group of listeners which may be identified or associated with a unique identifier. Other aspects of the current invention are disclosed as well, including the use of a provisioning server to generate parameters from interaction with one or more intended user, said parameters being stored associated with the unique identifier, and subsequently used by the media enhancement server for the modification of the audio intended for the one or more user or subscriber.

The technology described herein can be realized in hardware, software, or a combination of hardware and software. The technology described herein can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The technology described herein also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

In the embodiments described above, the software may be configured to run on any computer or workstation such as a PC or PC-compatible machine, an Apple Macintosh, a Sun workstation, a dedicated array monitoring system, etc. In general, any device can be used as long as it is able to perform all of the functions and capabilities described herein. The particular type of computer, workstation, or system is not central to the technology, nor is the configuration, location, or design of a database, which may be flat-file, relational, or object-oriented, and may include one or more physical and/or logical components.

The servers may include a network interface continuously connected to the network, and thus support numerous geographically dispersed users and applications. In a typical implementation, the network interface and the other internal components of the servers intercommunicate over a main bi-directional bus. The main sequence of instructions effectuating the functions of the technology and facilitating interaction among clients, servers and a network, can reside on a mass-storage device (such as a hard disk or optical storage unit) as well as in a main system memory during operation. Execution of these instructions and effectuation of the functions of the technology is accomplished by a central-processing unit ("CPU").

A group of functional modules that control the operation of the CPU and effectuate the operations of the technology as described above can be located in system memory (on the server or on a separate machine, as desired). An operating system directs the execution of low-level, basic system functions such as memory allocation, file management, and operation of mass-storage devices. At a higher level, a control block, implemented as a series of stored instructions, responds to client-originated access requests by retrieving the user-specific profile and applying the one or more rules as described above.

Data communication may take place via any media such as standard telephone lines, LAN or WAN links (e.g., T1, T3, 56 kb, X.25), broadband connections (ISDN, Frame Relay, ATM), wireless links, and so on. Preferably, the network can carry TCP/IP protocol communications, and HTTP/HTTPS requests made by the client and the connection between the client and the server can be communicated over such TCP/IP networks. The type of network is not a limitation, however, and any suitable network may be used. Typical examples of networks that can serve as the communications network include a wireless or wired Ethernet-based intranet, a local or wide-area network (LAN or WAN), and/or the global communications network known as the Internet, which may accommodate many different communications media and protocols.

Although the present invention and its advantages have been described in detail, it should be understood that various changes, substitutions and alterations can be made herein without departing from the spirit and scope of the invention as defined by the appended key concepts and any claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for improving perceived audio quality in a communications network comprising a provisioning server for routing audio from and to a user, the system comprising:
- a signal processor;
- a communication device connected to said communication network, wherein the communication device is associated with a user;
- an identifier received by said signal processor, wherein the identifier is associated with the user, wherein the identifier comprises at least one of a user name and a personal identification number (PIN), and wherein the identifier allows for improving perceived audio quality for the user on a plurality of devices;
- a transmitter for transmitting audio signals to said communication device, wherein the audio signals are transmitted as part of a hearing test;
- a receiver for receiving responses to said audio signal from said communication device;
- a comparator in said signal processor for determining the error between the audio signal transmitted from said signal processor to said communication device and the response audio signal; and
- a logic control generator for:
  - identifying at least one personalized parameter to be applied to subsequent audio signals transferred to said communication device, wherein the at least one personalized parameter is personalized for the user;

determining a type of the subsequent audio signals; and
based upon the type of the subsequent audio signals, modifying the subsequent audio signals signal provided to said media device using said personalized parameter.

2. The system of claim 1, wherein said identifier comprises at least one of a Mobile Identity number (MIN), an IMSI, a TMSI, a phone number, a SIP URL, a MAC address, a user name, a user selection, an account number, an IP address, a device address, a device serial number, a caller identification, an identity indication, a virtual connection (VC), a connection identifier, a CID, a CNID, and a line identification.

3. The system of claim 1, wherein said logic control generator is adapted to select a first personalized parameter for altering a voice signal, said first personalized parameter including at least one of an automatic gain control, an audio gain control, an equalization, and an energy redistribution.

4. The system of claim 1, wherein said transmitter, said receiver, said comparator, and said logic control generator are physically located in the provisioning server.

5. The system of claim 4, wherein said personalized parameter is transferred from said provisioning server to a media enhancement server and is applied to a subsequent audio signal by said media enhancement server.

6. The system of claim 5, wherein said media enhancement server is located discrete from said provisioning server.

7. The system of claim 1, wherein said logic control generator is adapted to generate the at least one personalized parameter in a first optimization step, and wherein the system further comprises a media enhancement server adapted to apply said personalized parameter to voice signals in a temporally different step.

8. The system of claim 7, wherein the provisioning server is adapted to receive a first telephone call and the media enhancement server is adapted to receive at least one subsequent telephone call and forward automatically the at least one subsequent telephone call to a third party.

9. The system of claim 7, wherein the provisioning server is adapted to receive a first telephone call from the user and the media enhancement server is adapted to receive at least one subsequent telephone call from a third party and forward automatically the at least one subsequent telephone call to the user.

10. The system of claim 7, wherein the provisioning server is adapted to initiate a first telephone call to the user and the media enhancement server is adapted to receive at least one subsequent telephone call from the user and forward automatically the at least one subsequent telephone call to a third party.

11. The system of claim 5, wherein said media enhancement server is adapted to store the at least one personalized parameter.

12. The system of claim 1, wherein said receiver is adapted to receive keyed information from an operator, wherein the operated records responses to said audio signals.

13. In a media communication network, a method for improving the quality of media content, the method comprising:

identifying a user with an identifier, wherein the identifier comprises at least one of a user name and a personal identification number (PIN), and wherein the identifier allows for improving perceived audio quality for the user on a plurality of devices;
transmitting a media signal to the user of said media device, wherein the media signal is transmitted as part of a hearing test;
receiving a response signal from said user;
comparing said transmitted media signal and said response signal to determine an error between said transmitted media signal and said response signal;
determining at least one personalized parameter, wherein the at least one personalized parameter is personalized for the user based on the error;
determining a type of a subsequent media signal; and
based upon the type of the subsequent media signal, modifying the subsequent media signal provided to said media device using said personalized parameter.

14. The method of claim 13, wherein said transmitted media signal and said response signal each comprise audio signals.

15. The method of claim 13, further comprising selectively applying said personalized parameter to a second subsequent media signal.

16. The method of claim 13, comprising applying the personalized parameter to a second media device based on a selection by the user.

17. The method of claim 13, further comprising applying, by a media enhancement server, said at least one personalized parameter to a second subsequent media signal in said communication network.

18. The method of claim 13, further comprising applying, by said media device, said at least one personalized parameter to a second subsequent media signal in said communication network.

19. A mass-storage device encoding computer executable instructions that, when executed by at least one processor, perform a method for improving the quality of media content, the method comprising:

identifying a user with an identifier, wherein the identifier comprises at least one of a user name, a personal identification number (PIN), and voice recognition, and wherein the identifier allows for improving perceived audio quality for the user on a plurality of devices;
transmitting a media signal to the user of said media device, wherein the media signal is transmitted as part of a hearing test;
receiving a response signal from said user;
comparing said transmitted media signal and said response signal to determine an error between said transmitted media signal and said response signal;
determining at least one personalized parameter, wherein the at least one personalized parameter is personalized for the user based on the error;
determining a type of a subsequent media signal; and
based upon the type of the subsequent media signal, modifying the subsequent media signal provided to said media device using said personalized parameter.

20. The mass-storage device of claim 19, wherein the method further comprises applying the personalized parameter to a second media device based on a selection by the user.

* * * * *